US011228212B2

(12) United States Patent
Yoon et al.

(10) Patent No.: US 11,228,212 B2
(45) Date of Patent: Jan. 18, 2022

(54) ROLLABLE METAMATERIAL SCREEN FOR MAGNETIC RESONANCE COUPLING BASED HIGH EFFICIENCY WIRELESS POWER TRANSFER

(71) Applicant: University of Florida Research Foundation, Inc., Gainesville, FL (US)

(72) Inventors: Yong-Kyu Yoon, Gainesville, FL (US); Woosol Lee, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 17/179,839

(22) Filed: Feb. 19, 2021

(65) Prior Publication Data

US 2021/0265873 A1 Aug. 26, 2021

Related U.S. Application Data

(60) Provisional application No. 62/979,086, filed on Feb. 20, 2020.

(51) Int. Cl.
| | | |
|---|---|---|
| H02J 50/70 | (2016.01) | |
| H02J 50/12 | (2016.01) | |
| H01F 27/36 | (2006.01) | |
| H02J 50/20 | (2016.01) | |
| H01F 38/14 | (2006.01) | |
| H02J 50/40 | (2016.01) | |

(52) U.S. Cl.
CPC .............. *H02J 50/70* (2016.02); *H01F 27/36* (2013.01); *H01F 38/14* (2013.01); *H02J 50/12* (2016.02); *H02J 50/20* (2016.02); *H02J 50/40* (2016.02)

(58) Field of Classification Search
CPC .. H02J 50/70; H02J 50/12; H02J 50/20; H02J 50/40; H01F 27/36; H01F 38/14
See application file for complete search history.

(56) References Cited

U.S. PATENT DOCUMENTS

| | | | |
|---|---|---|---|
| 1,119,732 A | 12/1914 | Tesla | |
| 9,515,492 B2* | 12/2016 | Nomura | H01F 27/346 |
| 2011/0133568 A1* | 6/2011 | Wang | H02J 50/90 |
| | | | 307/104 |
| 2011/0260946 A1* | 10/2011 | Dandekar | H01Q 21/28 |
| | | | 343/893 |
| 2011/0266879 A1* | 11/2011 | Kim | H02J 50/12 |
| | | | 307/104 |

(Continued)

OTHER PUBLICATIONS

André Kurs et al. "Simultaneous mid-range power transfer to multiple devices." Applied Physics Letters. vol. 96. pp. 044102-1-044102-3. Jan. 26, 2010.

(Continued)

*Primary Examiner* — Jared Fureman
*Assistant Examiner* — Michael J Warmflash
(74) *Attorney, Agent, or Firm* — Thomas | Horstemeyer, LLP

(57) ABSTRACT

The present disclosure describes wireless power transfer systems and methods. One such system comprises a transmitter coil coupled to a power source; a receiver coil coupled to a load; and a metamaterial screen disposed between the transmitter coil and the receiver coil and configured to amplify and focus a magnetic field generated by the transmitter coil towards the receiver coil in a non-contact manner. Other systems and methods are also disclosed.

16 Claims, 31 Drawing Sheets

(56) References Cited

U.S. PATENT DOCUMENTS

| | | | | |
|---|---|---|---|---|
| 2011/0267247 A1* | 11/2011 | Choi | ............... | H01Q 15/0086 |
| | | | | 343/753 |
| 2014/0159479 A1* | 6/2014 | Nomura | ............... | H02J 50/12 |
| | | | | 307/9.1 |
| 2014/0347240 A1* | 11/2014 | Dandekar | ............ | H01Q 1/523 |
| | | | | 343/841 |
| 2017/0244455 A1* | 8/2017 | Urzhumov | ............ | H04B 7/046 |

OTHER PUBLICATIONS

Bingan Wang et al. "Experiments on wireless power transfer with metamaterials." Applied Physics Letters. Letter 98 pp. 254101-1-254101-3. Jun. 20, 2011.

A. L. A. K. Ranaweera et al. "Experimental investigation of compact metamaterial for high efficiency mid-range wireless power transfer applications." Journal Of Applied Physics. vol. 116 pp. 043914-1-043914-8. Jul. 30, 2014.

Yeonje Cho et al. "Thin Hybrid Metamaterial Slab with Negative and Zero Permeability for High Efficiency and Low Electromagnetic Field in Wireless Power Transfer Systems." IEEE Transactions on Electromagnetic Compatibility. vol. 60, No. 4. pp. 1001-1009. Aug. 2018.

Tarakeswar Shaw et al. "Wireless Power Transfer System Based on Magnetic Dipole Coupling With High Permittivity Metamaterials." IEEE Antennas And Wireless Propagation Letters. vol. 18, No. 9. pp. 1823-1827. Sep. 2019.

David R. Smith et al. "Partial focusing of radiation by a slab of indefinite media." Applied Physics Letters. vol. 84, No. 13. pp. 2244-2246 Mar. 29, 2004.

Stanislav Maslovskie et al. "Near-field enhancement and imaging in double planar polariton-resonant structures" Journal Of Applied Physics. vol. 96, No. 3. pp. 1292-1200. Aug. 1, 2004.

Willie J. Padilla et al. "Negative refractive index metamaterials". Materialstoday. vol. 9, No. 7-8. pp. 28-35. Jul.-Aug. 2006.

T. Hao et al. "Optimisation of Metamaterials by Q factor". Electron. Lett. vol. 41, No. 11, p. 653, 2005.

D. R. Smith et al. "Determination of effective permittivity and permeability of metamaterials from reflection and transmission coefficients." The American Physical Society. vol. 65. pp. 195104-1-195104-5. 2002.

D. R. Smith et al. "Electromagnetic parameter retrieval from inhomogeneous metamaterials." The American Physical Society. vol. 71. pp. 036617-1-036617-11. 2005.

Xudong Chen et al. "Robust method to retrieve the constitutive effective parameters of metamaterials." The American Physical Society. vol. 70. pp. 016608-1-016608-7. 2004.

Huy Hoang et al. "An Adaptive Technique to Improve Wireless Power Transfer for Consumer Electronics." IEEE Transactions on Consumer Electronics. vol. 58, No. 2. pp. 327-332. May 2012.

Alanson P. Sample et al. "Analysis, Experimental Results, and Range Adaptation of Magnetically Coupled Resonators for Wireless Power Transfer." IEEE Transactions of Industrial Electronics. vol. 58, No. 2. pp. 544-554. Feb. 2011.

Thuc Phi Duong et al. "Experimental Results of High-Efficiency Resonant Coupling Wireless Power Transfer Us a Variable Coupling Method." IEEE Microwave And Wireless Components Letters. vol. 21, No. 8. pp. 442-444. Aug. 2011.

Ajit Rajagopalan et al. "Improving Power Transfer Efficiency of a Short-Range Telemetry System Using Compact Metamaterials." IEEE Transactions On Microwave Theory And Techniques. vol. 62, No. 4. pp. 947-955. Apr. 2014.

Erik Saturnino Gámez Rodríguez et al. "Compact Low-Frequency Metamaterial Design for Wireless Power Transfer Efficiency Enhancement." IEEE Transactions On Microwave Theory And Techniques. vol. 64, No. 5. pp. 1644-1654. May 2016.

Yeonje Cho et al. "Thin Hybrid Metamaterial Slab With Negative and Zero Permeability for High Efficiency and Low Electromagnetic Field in Wireless Power Transfer System." IEEE Transactions On Electromagnetic Compatibility. vol. 60, No. 4. Aug. 2018.

* cited by examiner

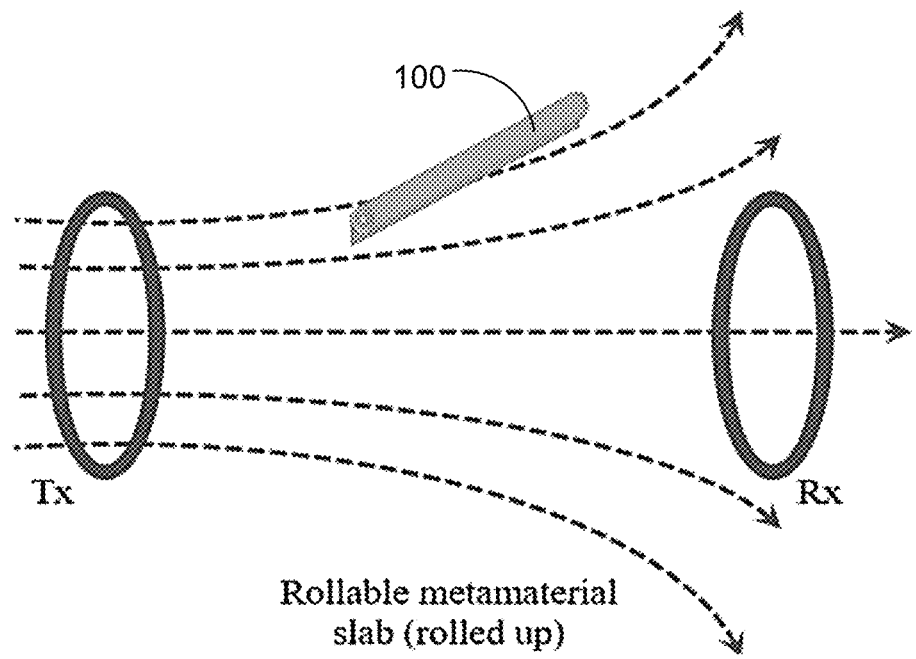
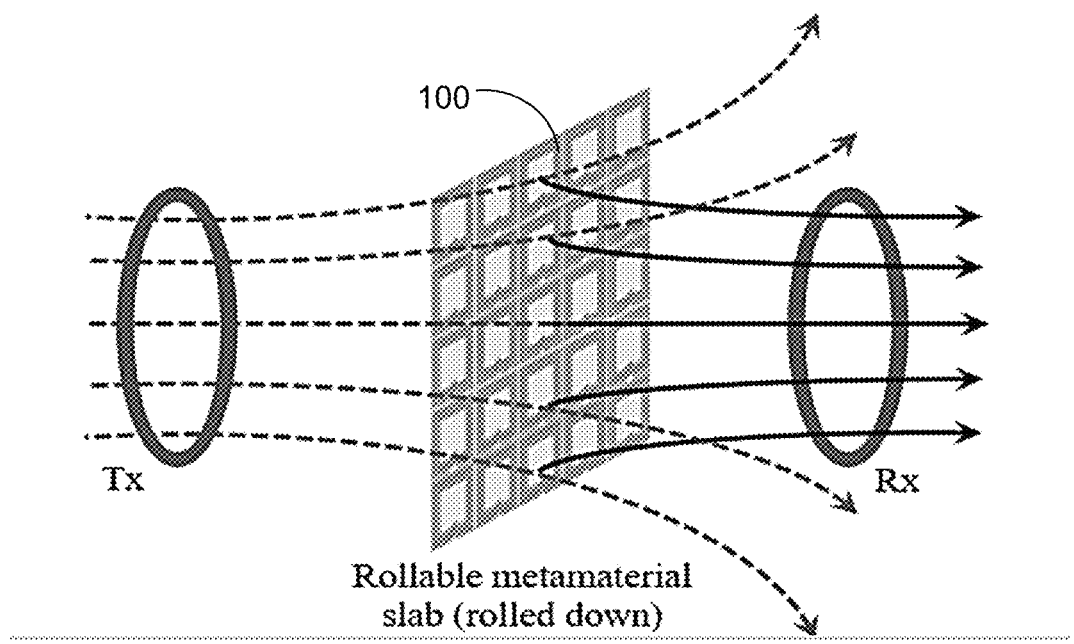
FIG. 1

Table 1. Comparison of the rollable metamaterial screen with earlier reported metamaterial (MTM) based WPT systems

| Ref. | Operating frequency (MHz) | Diameter of Tx/Rx coils (mm) | Negative refraction index | Configuration of the MTM | Transfer distance (mm) | Normalized transfer distance | Thickness of the MTM slab (mm) | Flexibility / Rollability | Efficiency with MTM (%) |
|---|---|---|---|---|---|---|---|---|---|
| [1] | 27 | 400 | $\mu_r = -1$ | Double sided with via | 500 | 2.5 | 1.64 | X | 47 |
| [2] | 6.5 | 600 | Negative $\mu_r$ | Single sided | 900 | 3 | 12 | X | 50 |
| [2] | 6.5 | 600 | Negative $\mu_r$ | Single sided, 3D structure | 900 | 3 | 150 | X | 54 |
| [3] | 7.43 | 150 | $\mu_r = 0$, $\mu_r = -1$ | Double sided with via | 250 | 2.67 | 1.6 | X | 18.6 |
| [4] | 26.65 | Tx=50 Rx=36 | $\mu_r = -1$ | Double sided | 50 | 2 | 19 | X | 18.23 |
| [5] | 5.57 | 40 | $\mu_r = -1$ | 3D structure | 40 | 2 | 26 | X | 35 |
| This work | 4.5 | 600 | $\mu_r = -1$ | Single sided | 900 | 3 | 0.16 | O | 63.04 |

References:
[1] - B. Wang; K. H. Teo; T. Nishino; W. Yerazunis; J. Barnwell; J. Zhang. "Experiments on Wireless Power Transfer with Metamaterials," Appl. Phys. Lett., Vol. 98, No. 25, 2011, Art. No. 254101.
[2] - A. L. A. K. Ranaweera, T. P. Duong; J. W. Lee, "Experimental Investigation of Compact Metamaterial for High Efficiency Mid-Range Wireless Power Transfer Applications," Journal of Applied Physics 116, pp. 043914.1-043914.8, Jul 2014.
[3] - Y. Cho, et al.: "Thin Hybrid Metamaterial Slab with Negative and Zero Permeability for High Efficiency and Low Electromagnetic Field in Wireless Power Transfer Systems," IEEE Trans. Electromagn. Compat., Vol. 60, No. 4, 2018.
[4] - A. Rajagopalan; A. K. RamRakhyani; D. Schurig; G. Lazzi: "Improving Power Transfer Efficiency of a Short-Range Telemetry System using Compact Metamaterials, IEEE Trans. Microw. Theory Techn., Vol. 62, No. 4, pp. 947–955, Apr. 2014.
[5] - E. S. G. Rodriguez; A. K. RamRakhyani; D. Schurig; G. Lazzi, "Compact Low-Frequency Metamaterial Design for Wireless Power Transfer Efficiency Enhancement, IEEE Trans. Microw. Theory Techn. Vol. 64, No. 5, pp. 1644–1654, May 2016.

FIG. 12

TABLE II. COMPARISON OF THIS WORK WITH OTHER METAMATERIAL (MTM) BASED WPT SYSTEMS

| Ref. | Operating frequency (MHz) | Diameter of Tx/Rx coils (mm) | Negative refraction index | Configuration of the MTM | Transfer /working distance (mm) | Normalized transfer/working distance | Thickness of the MTM slab (mm) | Tuna bility | Efficiency with MTM (%) |
|---|---|---|---|---|---|---|---|---|---|
| [1] | 27 | 400 | $\mu_r = -1$ | Double sided | 500 / 240 | 2.5 / 2 | 1.64 | X | 47 |
| [2] | 6.5 | 600 | Negative $\mu_r$ | Single sided | 900 / 450 | 3 / 1.5 | 1.2 | X | 50 |
| [3] | 7.43 | 150 | $\mu_r = 0, -1$ | Double sided | 200 / 165 | 2.67 / 2.2 | 1.6 | X | 18.6 |
| [4] | 26.65 | Tx=50, Rx=36 | $\mu_r = -1$ | Double sided | 79 / 50 | 3.72 / 2.35 | 19 | X | 18.23 |
| [5] | 5.57 | 40 | $\mu_r = -1$ | 3D structure | 40 / 10 | 2 / 0.5 | 26 | X | 35 |
| This work | 6.78 | Tx=600 Rx=600, 150 | $\mu_r = -1.01$ $\mu_r = -3.07$ | Single sided | 900 / 450 | 3 / 1.5 (Case 1), 6 / 3 (Case 2, 3, 4) | 0.16 | O | 63.04 (Case 1) 27.2, 23.5, 18.49 (Case 2, 3, 4) |

FIG. 20

References:

[1] - B. Wang; K. H. Teo; T. Nishino; W. Yerazunis; J. Barnwell; J. Zhang, "Experiments on Wireless Power Transfer with Metamaterials," Appl. Phys. Lett., Vol. 98, No. 25, 2011, Art. No. 254101.

[2] - A. L. A. K. Ranaweera, T. P Duong; J. W. Lee, "Experimental Investigation of Compact Metamaterial for High Efficiency Mid-Range Wireless Power Transfer Applications," Journal of Applied Physics 116, pp. 043914.1-043914.8, Jul 2014.

[3] - Y. Cho, et al.: "Thin Hybrid Metamaterial Slab with Negative and Zero Permeability for High Efficiency and Low Electromagnetic Field in Wireless Power Transfer Systems," IEEE Trans. Electromagn. Compat., Vol. 60, No. 4, 2018.

[4] - A. Rajagopalan; A. K. RamRakhyani; D. Schurig; G. Lazzi: "Improving Power Transfer Efficiency of a Short-Range Telemetry System using Compact Metamaterials, IEEE Trans. Microw. Theory Techn., Vol. 62, No. 4, pp. 947–955, Apr. 2014.

[5] - E. S. G. Rodriguez; A. K. RamRakhyani; D. Schurig; G. Lazzi, "Compact Low-Frequency Metamaterial Design for Wireless Power Transfer Efficiency Enhancement, IEEE Trans. Microw. Theory Techn., Vol. 64, No. 5, pp. 1644–1654, May 2016.

ROLLABLE METAMATERIAL SCREEN FOR MAGNETIC RESONANCE COUPLING BASED HIGH EFFICIENCY WIRELESS POWER TRANSFER

CROSS-REFERENCE TO RELATED APPLICATION

This application claims priority to co-pending U.S. provisional application entitled, "ROLLABLE METAMATERIAL SCREEN FOR MAGNETIC RESONANCE COUPLING BASED HIGH EFFICIENCY WIRELESS POWER TRANSFER," having Ser. No. 62/979,086, filed Feb. 20, 2020, which is entirely incorporated herein by reference.

BACKGROUND

Recently, the research and development of wireless power transfer (WPT) is actively being pursued with the high demand for wireless charging in modern electronics. However, most of the current WPT systems have a limited power transfer distance and efficiency as they adopt the inductive coupling approach. In order to extend the power transfer to a mid-range distance, the magnetic resonance coupling (MRC)-based WPT can be pursued as an alternative. This method, first introduced by Tesla, improves the power transfer distance by using high-Q resonant coils. To enhance the power transfer efficiency (PTE) of an MRC-based WPT system, transmitter and receiver coils should be designed to resonate at the same frequency. However, an increase in transfer distance decreases the magnetic coupling between the transmitter and receiver coils so that the PTE of the system degrades. Thus, the transfer distance of the MRC-based WPT system is limited. Furthermore, the efficiency of the system is heavily affected by the level of misalignment between the transmitter and receiver coils. Due to these challenges of the MRC-based WPT, its research and practical application in commercial electronic devices have been limited.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 shows an exemplary configuration of a rollable metamaterial screen within an enhanced wireless power transfer (WPT) system in accordance with embodiments of the present disclosure.

FIG. 12 shows a table ("Table I") comparing an exemplary enhanced WPT system with a rollable metamaterial screen with the performances of previously reported metamaterial-based WPT systems.

FIG. 20 shows a table ("Table II") comparing an exemplary enhanced WPT system with a rollable metamaterial screen for various alignment cases with the performances of previously reported metamaterial-based WPT systems.

Figure 21A:
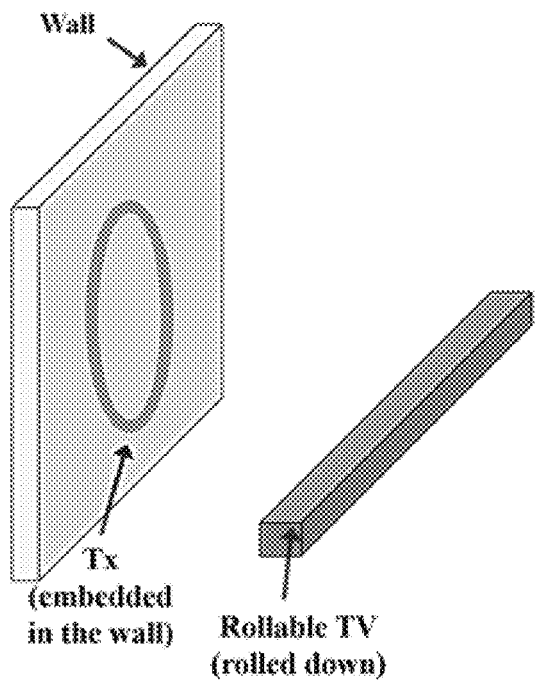
Figure 21B:
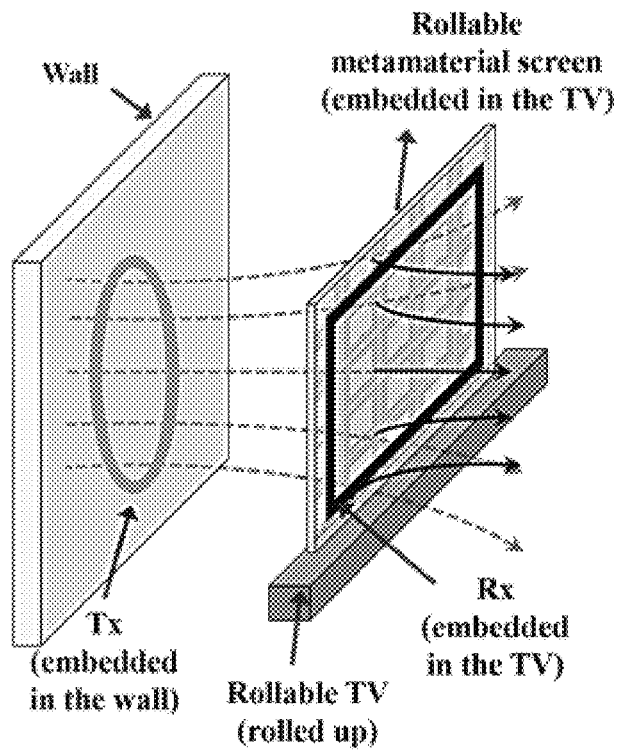

FIGS. 21A-21B show a configuration of a rollable TV equipped with the rollable metamaterial screen based WPT being: (A) rolled down and (B) rolled up in accordance with various embodiments of the present disclosure.

Figure 22A:
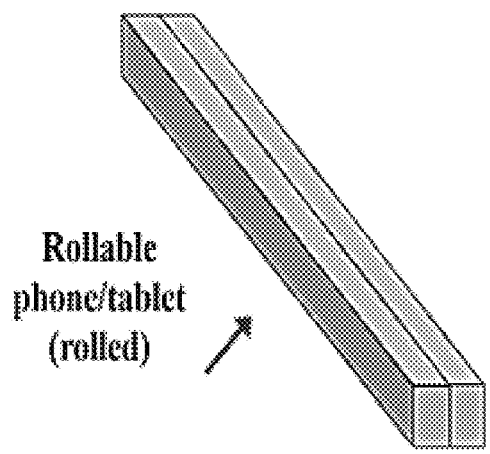
Figure 22B:
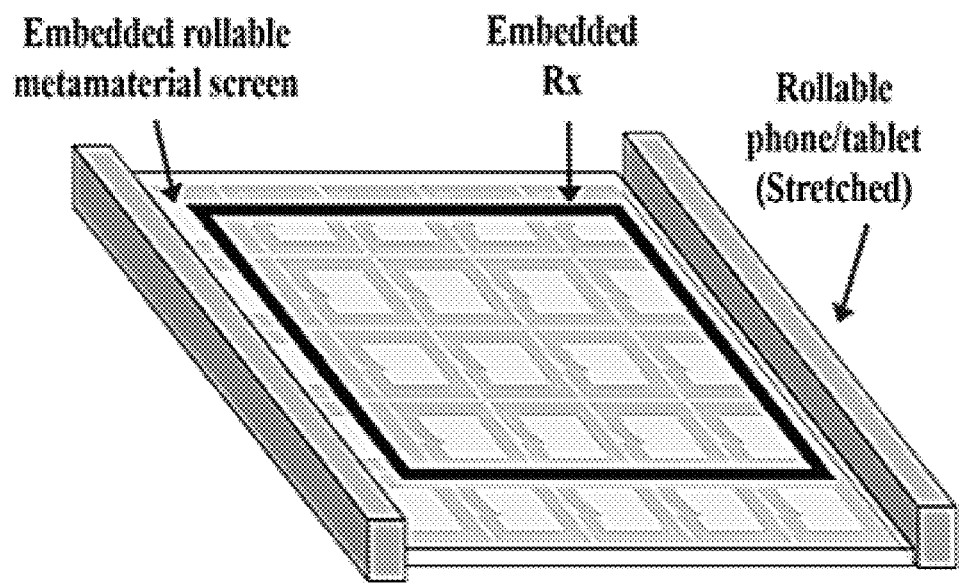

FIGS. 22A-22B show a configuration of a rollable phone/tablet equipped with the rollable metamaterial screen based WPT being: (A) rolled and (B) stretched in accordance with various embodiments of the present disclosure.

DETAILED DESCRIPTION

The present disclosure describes various embodiments of systems, apparatuses, and methods for an enhanced wireless power transfer system with a metamaterial screen. In various embodiments, the metamaterial screen is, but not limited to, a rollable screen that can be expanded and positioned between a transmitter (Tx) and receiver (Rx) in a wireless power transfer (WPT) system. Additionally, in various embodiments, the metamaterial screen comprises a metamaterial slab having tunable unit cells.

As such, embodiments of the present disclosure provide a rollable metamaterial screen for high efficiency wireless power transfer (WPT) based on magnetic resonance coupling. In one embodiment, the rollable metamaterial screen has a fully expanded area of 750 mm×750 mm and is located in between transmitter and receiver coils of an WPT system to help focus the magnetic field and thus significantly improve power transfer efficiency (PTE). Moreover, in various embodiments, the screen can be rolled up e.g. onto the ceiling when not used, and thus does not require any designated space for the screen saving space. In various embodiments, an exemplary WPT system operates at, but is not limited to, 4.5 MHz. Experimental results show that an exemplary metamaterial screen improves PTE even in a misaligned condition.

Recently, a high demand for wireless power charging in the modern electronics has accelerated active research and development of wireless power transfer (WPT) technologies. However, most of the existing WPT systems have limited power transfer distance as they take the inductive coupling approach, where the power transfer efficiency (PTE) rapidly decreases as the distance between transmitter (Tx) and receiver (Rx) coils increases.

Previously, researchers have reported that metamaterials can be utilized for improving the transfer efficiency of the WPT system. Metamaterials are artificially engineered materials that show uncommon electromagnetic properties, such as evanescent wave amplification and negative refractive characteristics, which can be exploited for the enhancement of power transfer efficiency. The previously reported metamaterial structures have been inserted at the middle of the transmitter and receiver coils to increase the transfer efficiency of the WPT system. However, those metamaterial slabs have had bulky and volumetric structures such as three-dimensional (3D) and thick printed circuit board (PCB) based structures to realize the negative refractive properties. Recently, it has been reported that the negative refraction property could be realized without using bulky architectures. In fact, since the thick substrate could add an additional substrate loss, a thinner metamaterial layer is preferred. Also, WPT systems need to be compliant with the technology trend of reduced size, weight, and power (SWaP). Especially, for the efficient usage of the space, modern consumer electronics change their form factors and are deformed, rolled, and folded (e.g., rollable TVs and foldable smartphones) without compromising the performance of the electronic systems while enhancing portability. In accordance with the present disclosure, this trend is applied to a WPT system.

In one embodiment, an exemplary rollable metamaterial screen is formed of a flexible polyethylene substrate for high efficiency wireless power transfer within an enhanced WPT system. For example, an exemplary WPT system may be based on a 4-coil system that contains a source coil that is connected to a power source, a transmitter coil that is coupled to the source coil, a receiver coil that receives power from the transmitter coil, and a load coil that is coupled to the receiver coil. As represented in FIG. 1, an exemplary rollable metamaterial screen 100 is employed, but not limited to being employed, in a middle distance between the transmitter (Tx) and receiver (Rx) coils to enhance the transfer efficiency. For example, in certain embodiments, the rollable metamaterial screen can be located near or integrated with a receiver.

Since the rollable metamaterial screen 100 can be rolled up or rolled down as needed (FIG. 1), it enables users to utilize the space flexibly. For instance, the rolled-up screen 100 can be placed on the ceiling and, the screen 100 can be rolled-down when efficient WPT is needed. Accordingly, the PTE of the exemplary WPT system can be enhanced without using permanently occupying metamaterial space. In various embodiments, the exemplary rollable metamaterial screen 100 is realized on a thin metamaterial slab so that the transfer efficiency is effectively improved by decreasing the loss existing in the large and thick structure of the metamaterial slabs. In the present disclosure, the effectiveness of an enhanced WPT system is verified by qualitative light bulb experiments for practical consumer electronic applications and quantitative vector network analyzer-based experiments.

Even though a metamaterial screen can improve the transfer efficiency of a WPT system, the metamaterial itself introduces additional loss in the WPT system. Thus, in order to realize a low loss and thin artificial metamaterial, embodiments of the enhanced WPT system utilize a square spiral shaped resonator for a unit cell of the metamaterial screen. Previous studies show that this type of spiral resonator is preferred to a split ring resonator in terms of the Q-factor, which means the spiral resonator has lower loss than the split ring resonator.

In various embodiments, the square spiral shaped metamaterial unit cell is fabricated on a flexible polyethylene substrate (having a relative permittivity $\varepsilon_r$=2.25) which has a thickness of 0.0762 mm. In various embodiments, the metamaterial unit cell has three turns, with a copper strip width of 3 mm and a pitch of 3 mm between neighboring strips. The length of the unit cell is 140 mm, and the metal (copper) thickness is 0.0799 mm. In order to operate at a resonant frequency of the WPT system, a capacitor can be connected to each metamaterial unit cell.

Figure 2A:
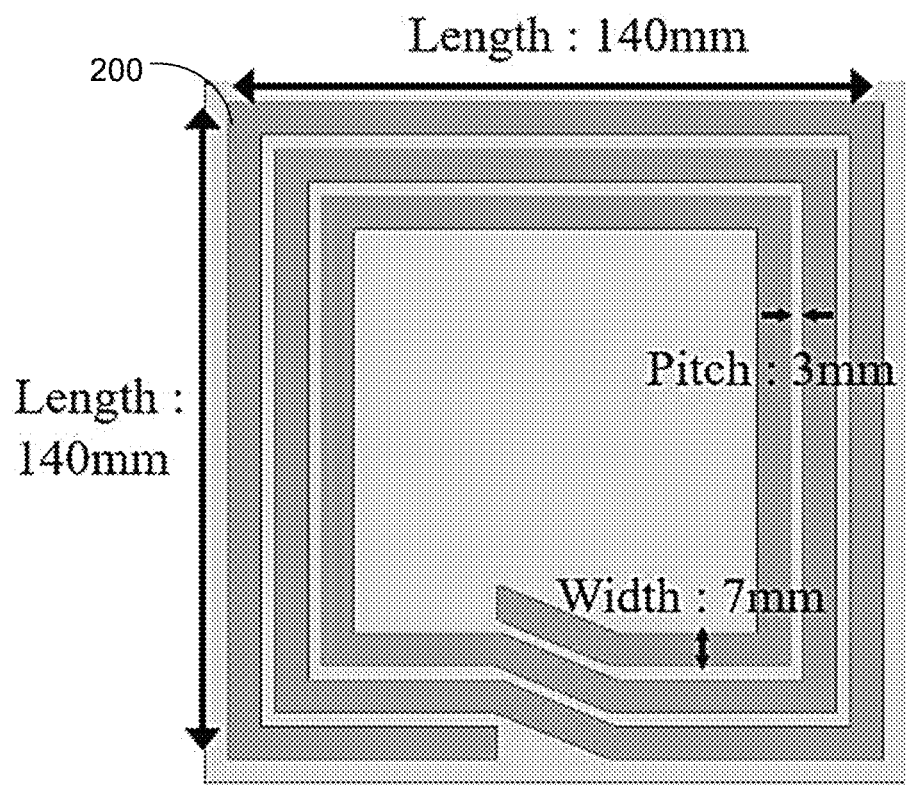
FIGS. 2A-2C show a schematic configuration of (A) a single metamaterial unit cell, (B) a single metamaterial unit cell with a capacitor, and (C) a rollable metamaterial screen in accordance with embodiments of the present disclosure.
Figure 2B:
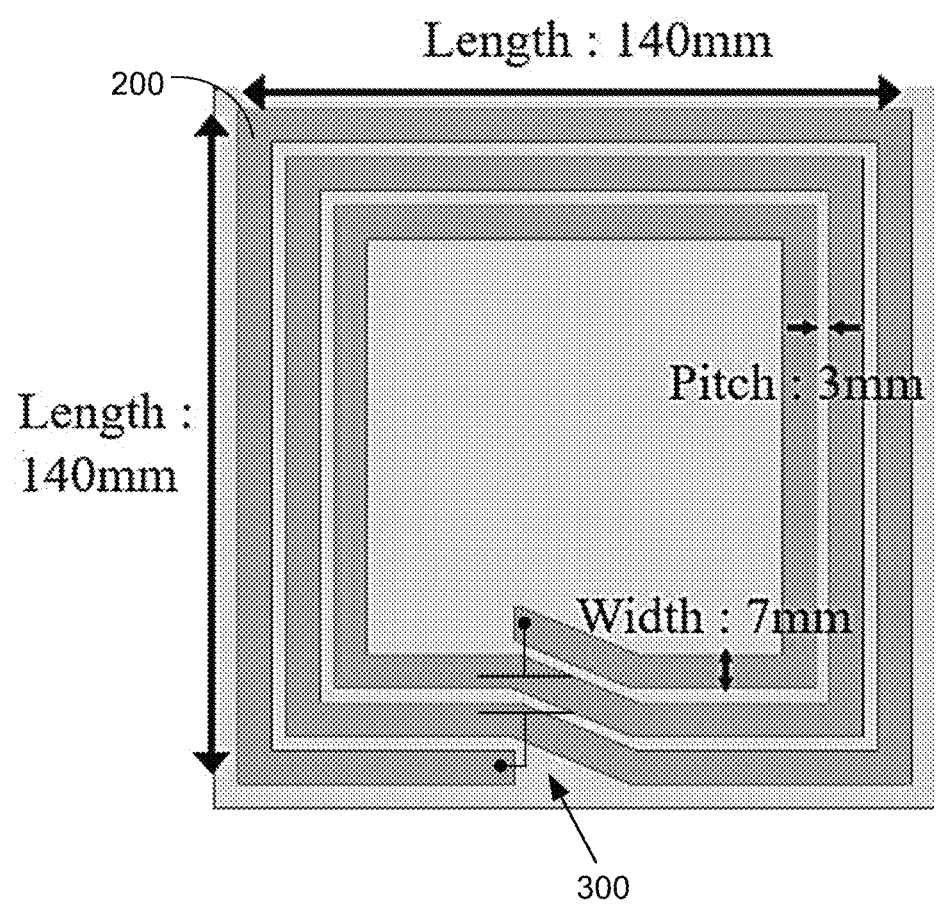
Figure 2C:
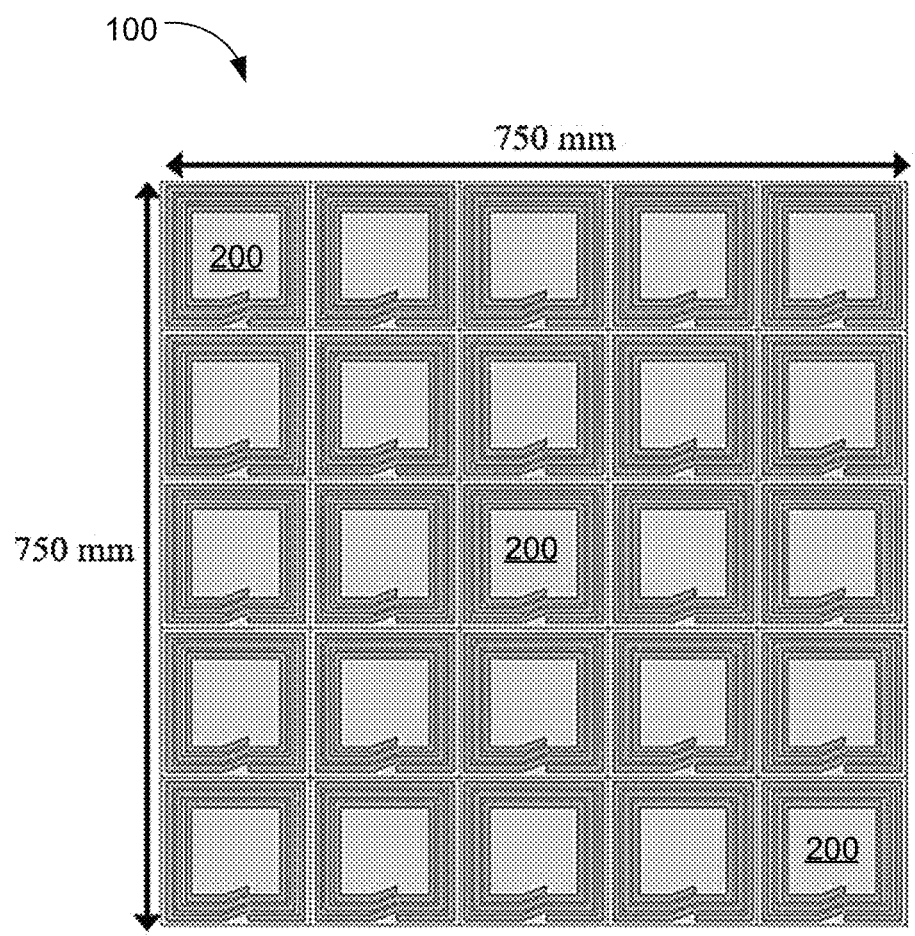

As shown in FIGS. 2A-2C, in one embodiment, an exemplary rollable metamaterial screen 100 contains 5×5 metamaterial unit cells 200 and the gap between the metamaterial unit cells 200 is 10 mm. In one embodiment, the total size of the rollable metamaterial screen is 750 mm×750 mm, and the total thickness of the rollable metamaterial screen is 0.16 mm, which is significantly thinner than the thickness of the previously reported metamaterial slabs (1.2 mm, 1.6 mm, and 23.3 mm). A capacitor 300 can be connected to each metamaterial unit cell, as shown in FIG. 2B.

Figure 3:
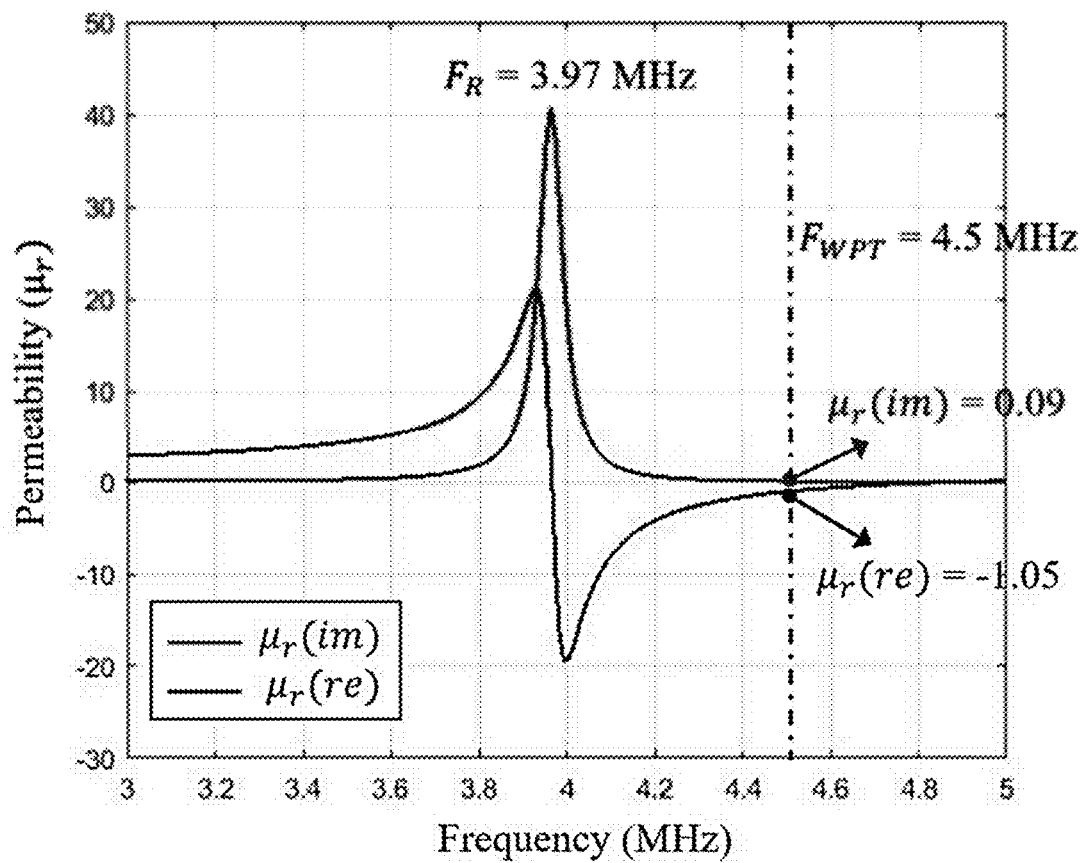
FIG. 3 shows simulation results of permeability for an exemplary rollable metamaterial screen in accordance with embodiments of the present disclosure.

To simulate a full 3D structure of an exemplary metamaterial unit cell 200, a High Frequency Structure Simulator (HFSS, Ansys Inc.) can be utilized. The refractive index and the value of the relative permeability can be achieved from the simulation results by using standard retrieval methods. Accordingly, FIG. 3 shows the simulation results of the relative permeability for the rollable metamaterial screen 100. Here, the real part of the relative permeability represents the refraction index which is the direction of magnetic field by the boundary conditions, and the imaginary part shows the magnetic loss. A metamaterial screen 100 with a large negative refraction index can focus the magnetic field effectively toward a preferred direction. However, when the negative refraction index becomes larger, the operating frequency becomes closer to the resonant frequency of the unit cell 200, thereby causing larger magnetic loss. Thus, both the real part and the imaginary part of the relative magnetic permeability are critical design factors.

An exemplary enhanced WPT system operates at a resonant frequency of 4.5 MHz, for one embodiment. Correspondingly, the resonant frequency of the metamaterial unit cells 200 is 3.97 MHz and its real value of the relative permeability is −1.05 at 4.5 MHz, which indicates that the metamaterial screen 100 has a negative refraction index value of −1. The imaginary value of the relative permeability is 0.09, which indicates that the metamaterial screen 100 has been designed to have relatively low magnetic loss.

Figure 4A:
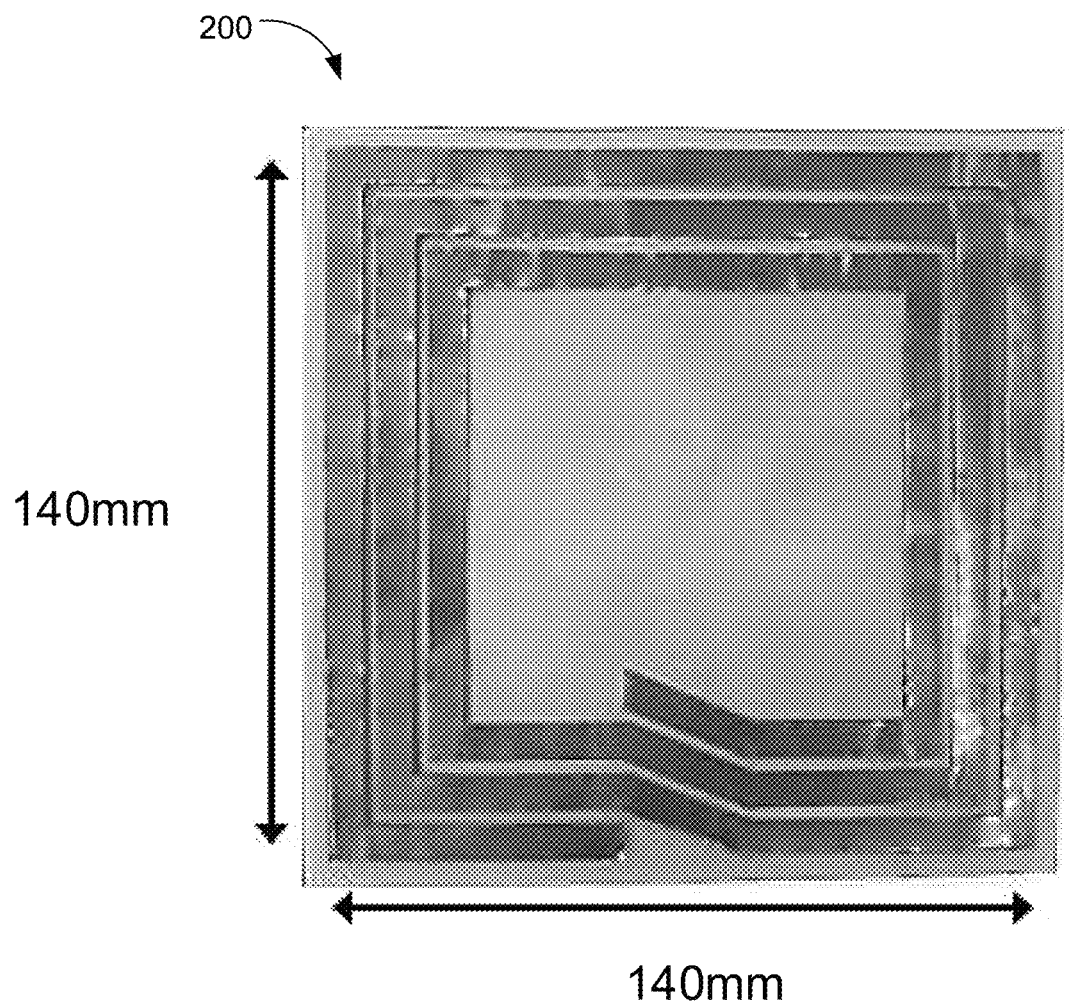
FIGS. 4A-4C show (A) a fabricated single unit cell, (B) a fabricated rollable metamaterial screen (rolled down), and (C) a fabricated rollable metamaterial screen (rolled up) in accordance with embodiments of the present disclosure.
Figure 4B:
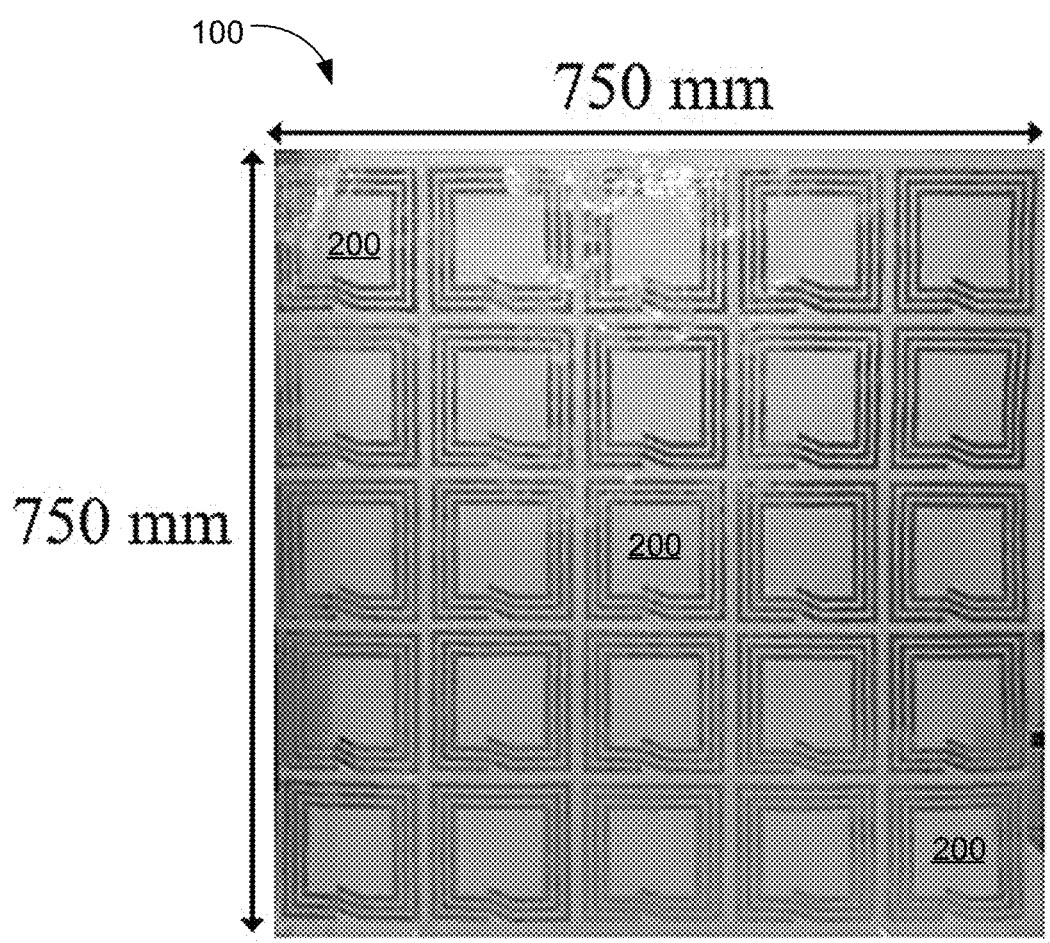
Figure 4C:
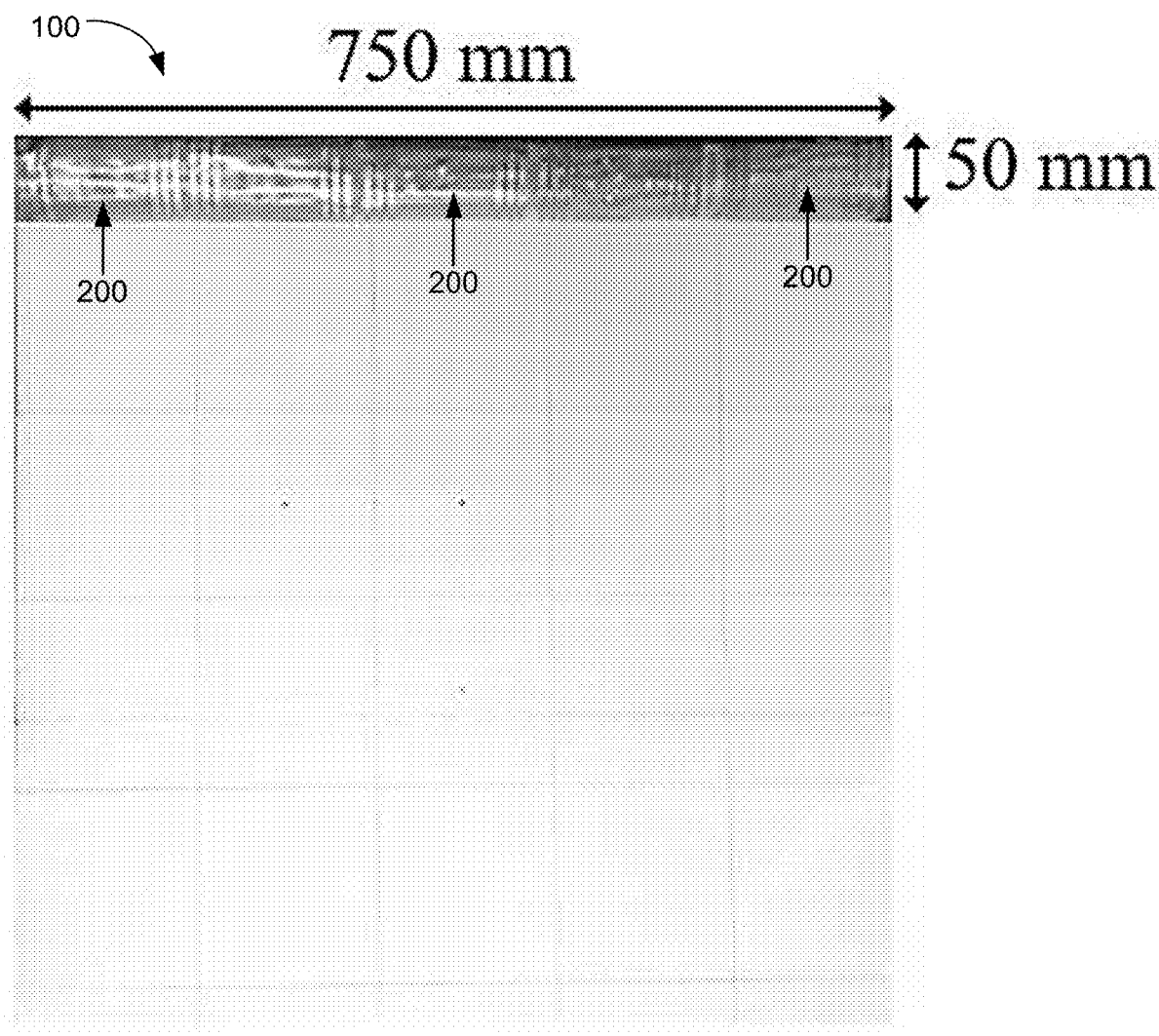
Figure 5:
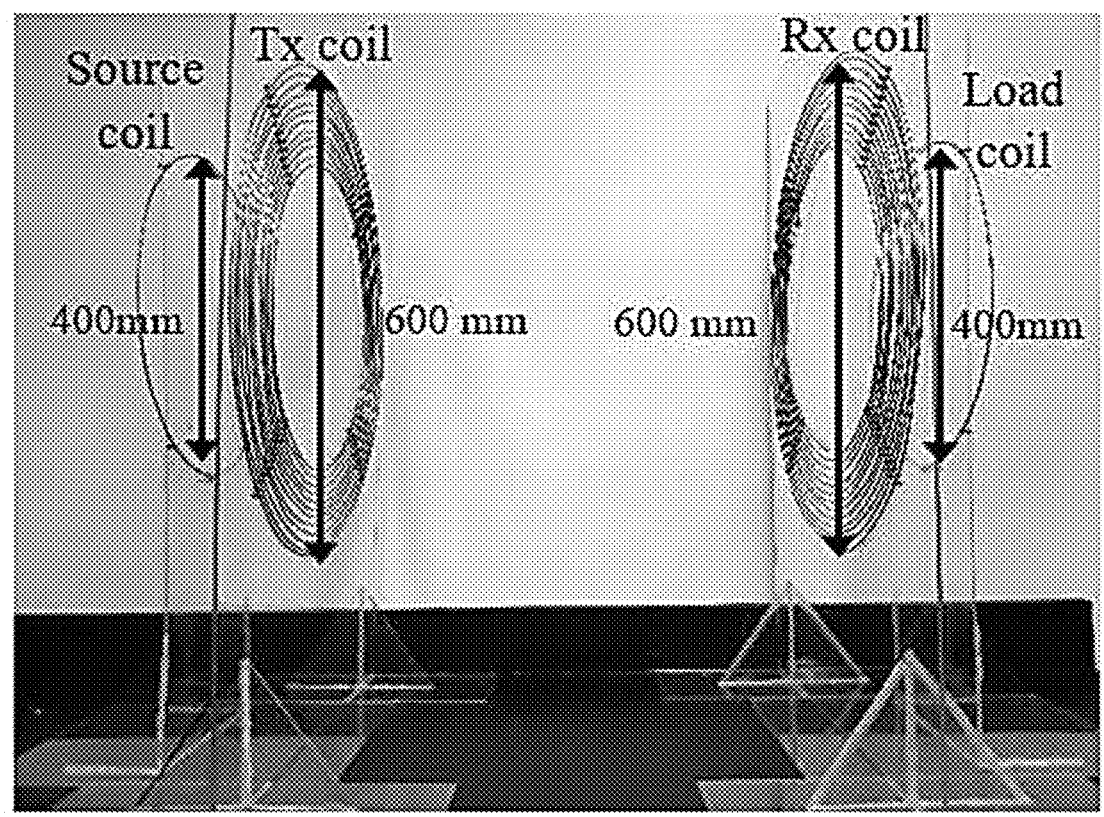
FIG. 5 shows a fabricated 4-coil wireless power transfer (WPT) system in accordance with embodiments of the present disclosure.

In various embodiments, the rollable metamaterial screen 100 is fabricated on a flexible and thin polyethylene substrate which has a thickness of 0.0762 mm, as shown in FIGS. 4A-4B. In order to have a negative refraction property at 4.5 MHz, a 940 pF capacitor 300 is connected to each unit cell 200 in parallel. The rollable metamaterial screen 100 is flexible and easy to roll as it has thin conductor and substrate layers. In addition, the 4-coil WPT system is built to verify the effectiveness of the rollable metamaterial screen 100. As shown in FIG. 5, the enhanced WPT system contains a source coil, a transmitter (Tx) coil, a receiver (Rx) coil, and a load coil. In one embodiment, the source and load coils have a single turn with a diameter of 400 mm, and the Tx and Rx coils have 12 turns with a turn-to-turn pitch of 1 cm and an outer diameter of 60 cm. All the coils are fabricated using a 2.588 mm diameter copper wire. This 4-coil WPT system's resonant frequency is 4.5 MHz.

Figure 6A:
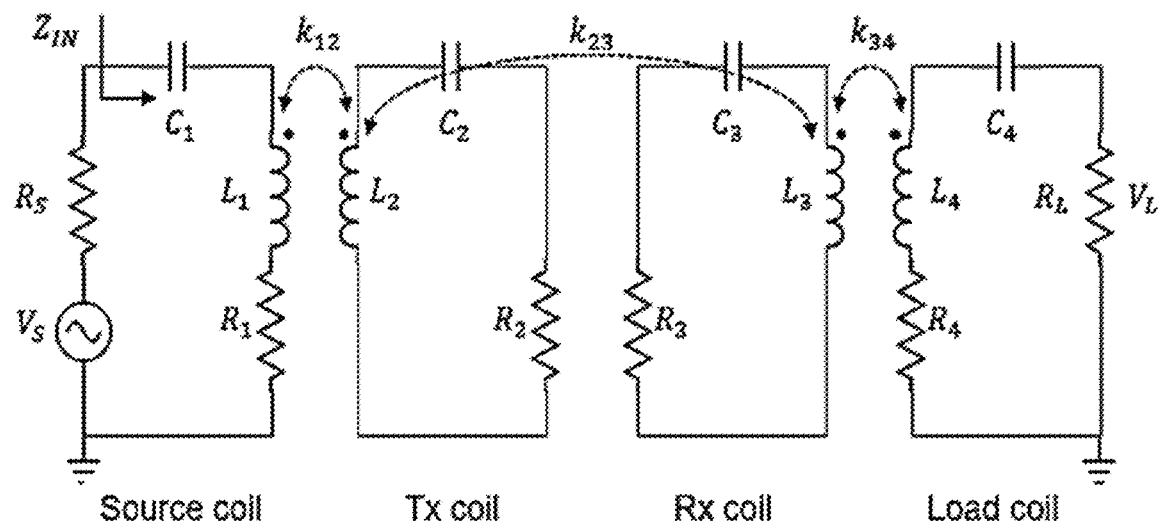
FIGS. 6A-6B show equivalent circuit models of (A) a 4-coil WPT system without the metamaterial screen and (B) a 4-coil WPT system with the metamaterial screen in accordance with embodiments of the present.
Figure 6B:
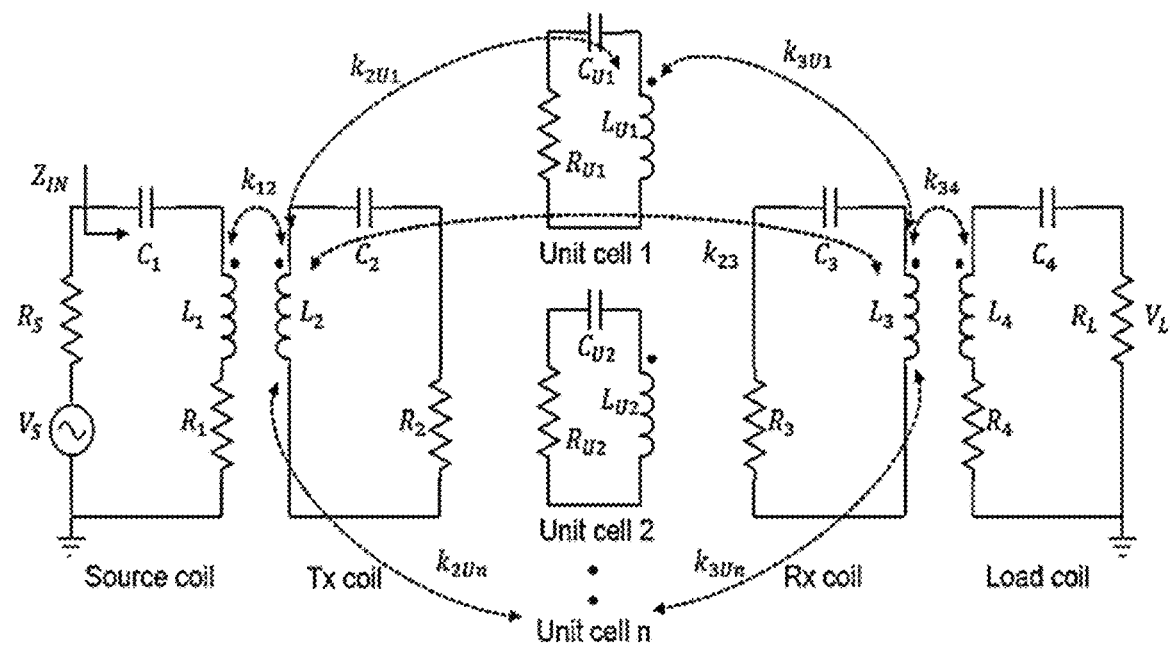

Equivalent circuit models of the 4-coil system with and without the metamaterial screen are shown in FIG. 6A and FIG. 6B, respectively. The parameters of each coil are described by $R_iL_iC_i$ models (i=1-4 and $U_1$-$U_n$). The coupling coefficients between two coils are represented by coefficients $k_{12}$, $k_{23}$, and $k_{34}$, while coefficients $k_{13}$, $k_{14}$, and $k_{24}$ are neglected as the corresponding distances are much larger and the coupling factors are much smaller than ones of the first group. In addition, $k_{2U_i}$ and $k_{3U_i}$ are included into the model when the metamaterial screen is used (i=$U_1$-$U_n$). In order to obtain the high PTE, the matching conditions of the WPT system should be satisfied. As for the 4-coil WPT system, $Z_{IN}$ should be matched to $R_S$ using the adaptive technique which means the distance between the source coil (load coil) and Tx coil (Rx coil) should be varied to satisfy the matching condition. The distance between Tx and Rx coils is varied in the measurements from 30 cm to 150 cm.

Figure 7:
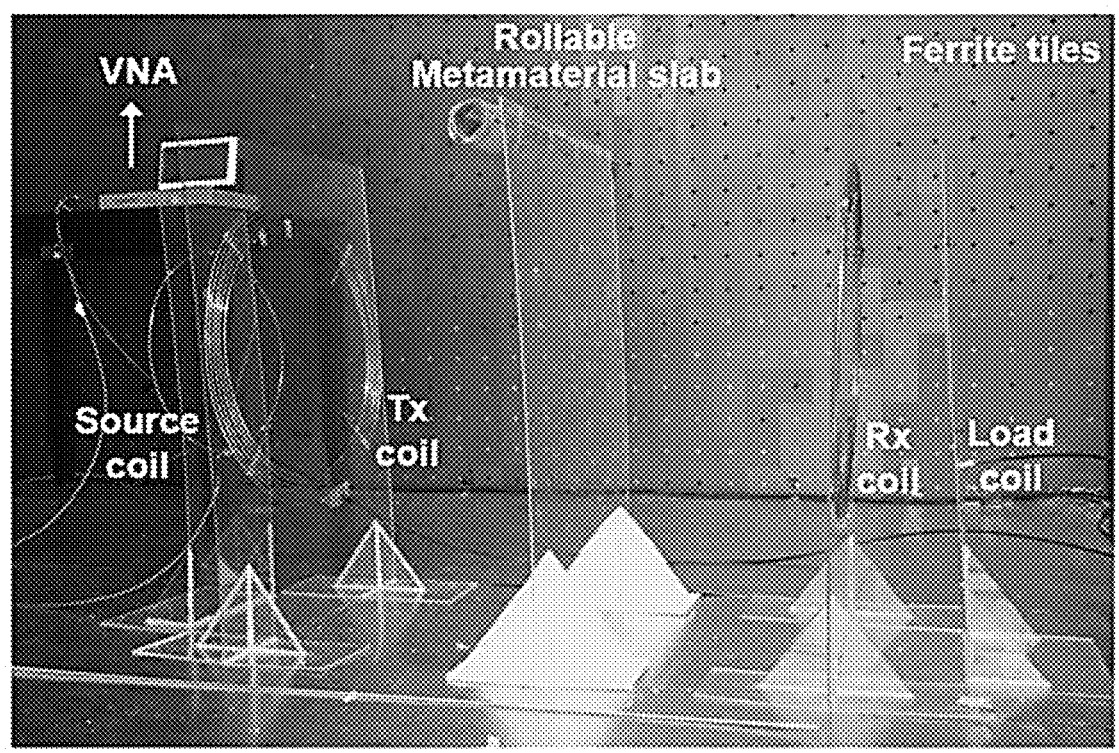
FIG. 7 shows a measurement setup for an exemplary WPT system with the rollable metamaterial screen in an anechoic chamber in accordance with embodiments of the present disclosure.

The PTE of the enhanced WPT system is measured quantitatively. For measurement purposes, a vector network analyzer (HP E8361A, Agilent, Inc.) is utilized, as shown in FIG. 7. The source and load coils are connected to two ports of the vector network analyzer. The magnitude of the S-parameter (S21) value is measured using the vector network analyzer. In the case of the enhanced WPT system, the PTE can be described as the ratio of the received power at the load (port 2) to the inserted power at the source (port 1), so the PTE can be calculated using the following equation:

$$\text{PTE}(\eta)=|S_{21}|^2 \times 100\% \quad (1)$$

The PTE of the enhanced WPT system is measured in an anechoic chamber (which is a room designed to absorb reflections of electromagnetic waves). The anechoic chamber allows for an exact PTE measurement without the contribution of the reflected electromagnetic waves. For the measurements of the PTEs, a WPT system without the metamaterial screen 100 (e.g., the screen is in a state of being rolled up) and a WPT system with the metamaterial screen 100 (e.g., the screen is in a state of being rolled down) are tested. In certain embodiments, the location of the rollable metamaterial screen 100 is at a middle distance between the Tx and Rx coils in order to achieve a maximum PTE. If the metamaterial screen is not placed in the middle, the mutual inductance between the metamaterial screen 100 and Tx or Rx coil can affect the resonant frequency of the WPT system. This unmatched condition will cause a degradation of the PTE at the resonant frequency. During experimental trials, the transfer distance between Tx and Rx coils is from 30 cm to 150 cm.

Figure 8:
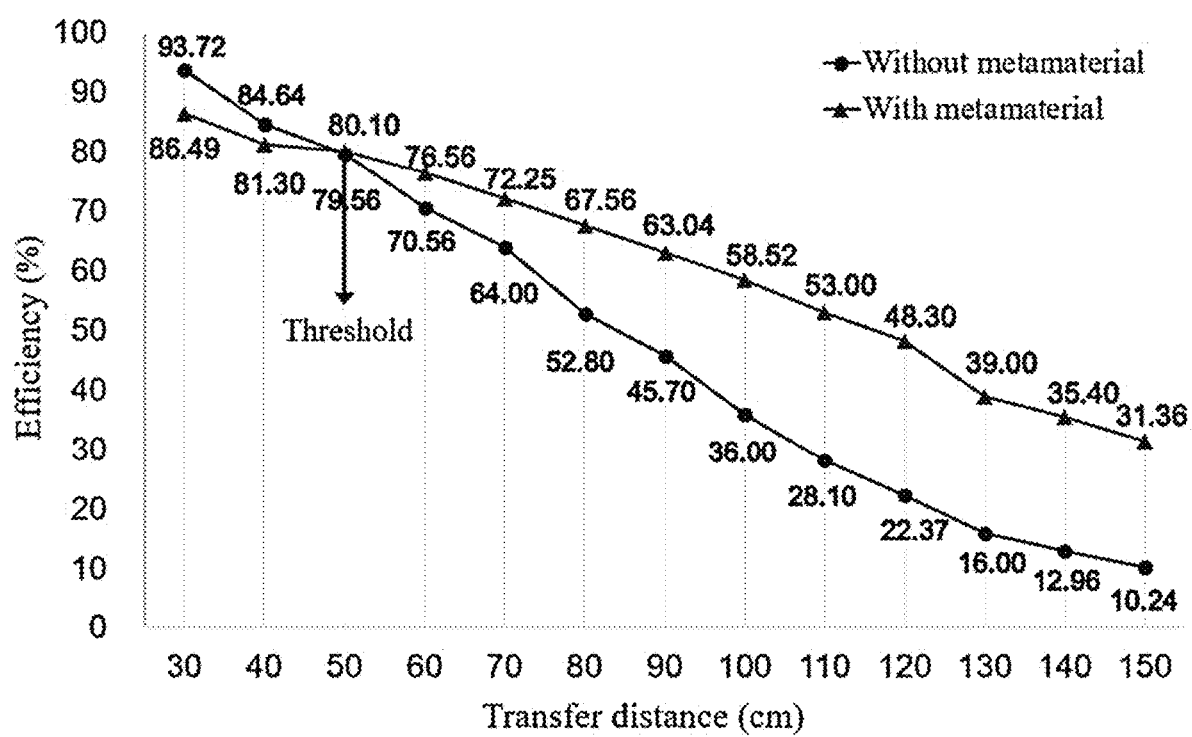
FIG. 8 is a graph showing a comparison of measured power transfer efficiency (PTE) of an exemplary WPT system without metamaterial (rolled up) and with metamaterial (rolled down) in accordance with embodiments of the present disclosure.
Figure 9A:
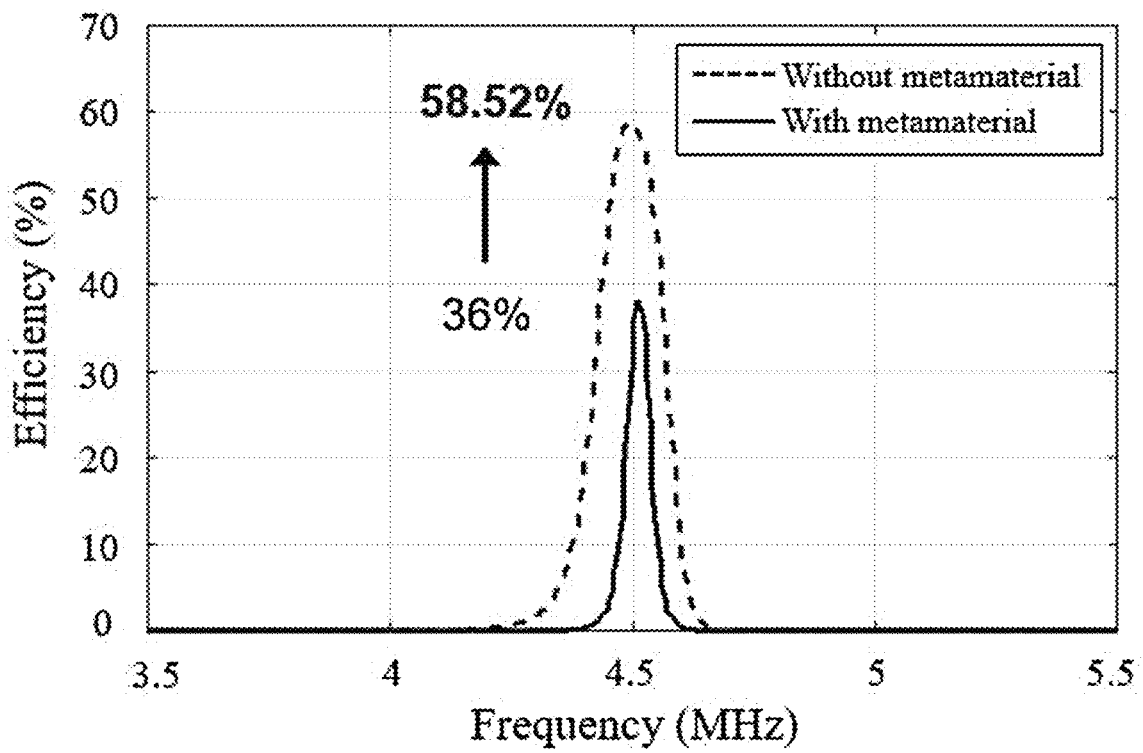
FIGS. 9A-9B are graphs showing a comparison between the measured PTE without metamaterial (rolled up) and with metamaterial (rolled down) at a distance of (A) 100 cm and (B) 150 cm.
Figure 9B:
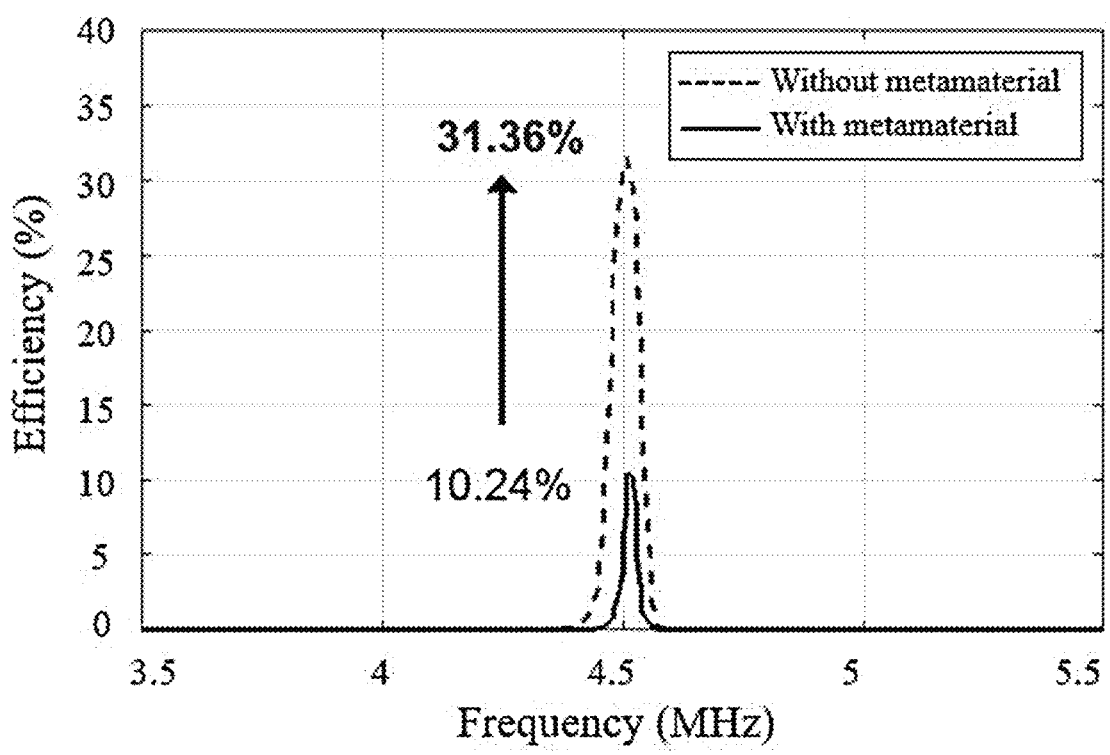

As shown in FIG. 8, there is a threshold distance (50 cm) above which the WPT system with the metamaterial screen 100 shows improved PTE. For both cases (with and without the metamaterial screen), an increase in transfer distance results in a linear decrease in the PTE. At the distance of 100 cm, the PTE improves from 36% to 58.52% after the metamaterial screen 100 is rolled down, as shown in FIG. 9A, which shows an improvement factor of 1.63. At the distance of 150 cm, the PTE improves from 10.24% to 31.36% after the metamaterial screen is rolled down, as shown in FIG. 9B. Accordingly, the figure shows an improvement factor of 3.06 at a transfer distance of 150 cm compared with a WPT system without a metamaterial screen. Moreover, when we compare the PTE at the distance of 100 cm without the metamaterial screen with the PTE at the distance of 140 cm with metamaterial screen, the measured PTEs for both cases are approximately the same which are about 36%. Thus, the transfer distance of the WPT can be effectively increased by rolling down the rollable metamaterial screen. The measurement results show that an exemplary rollable metamaterial screen 100 is highly effective for increasing the PTE and the transfer distance of a WPT system.

Figure 9C:
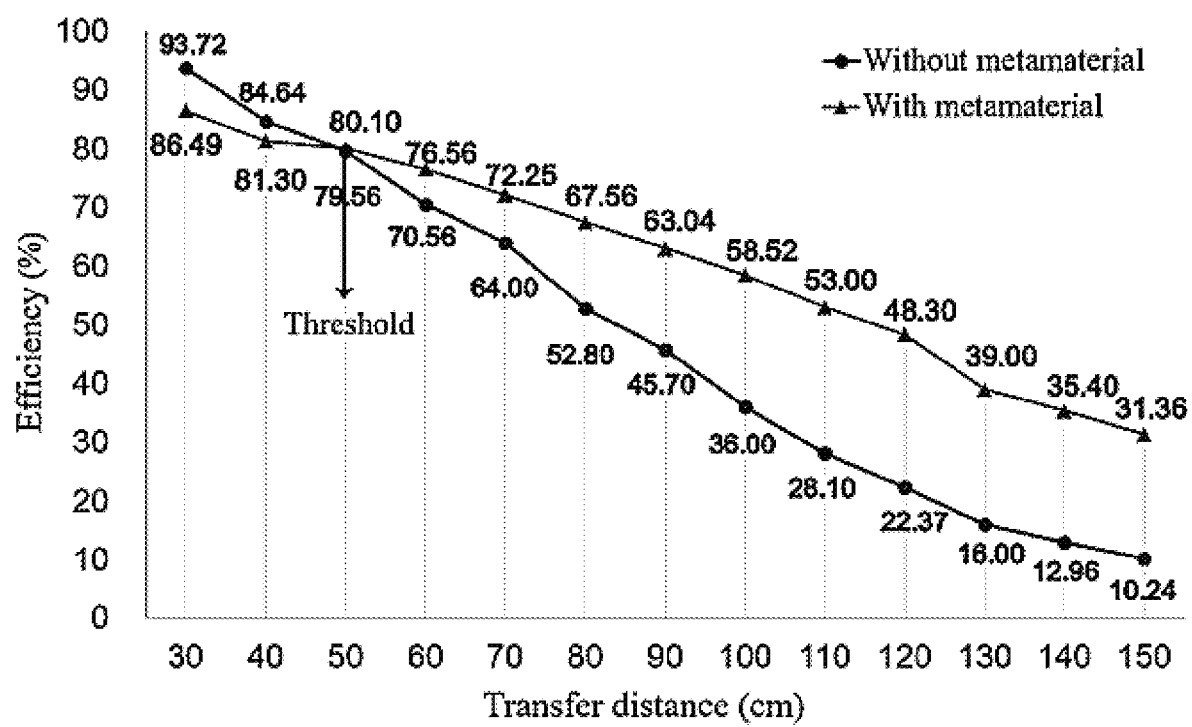
FIG. 9C is a graph showing measured PTE of an exemplary WPT system without metamaterial (rolled up) and with metamaterial (rolled down) in accordance with various embodiments of the present disclosure.
Figure 9D:
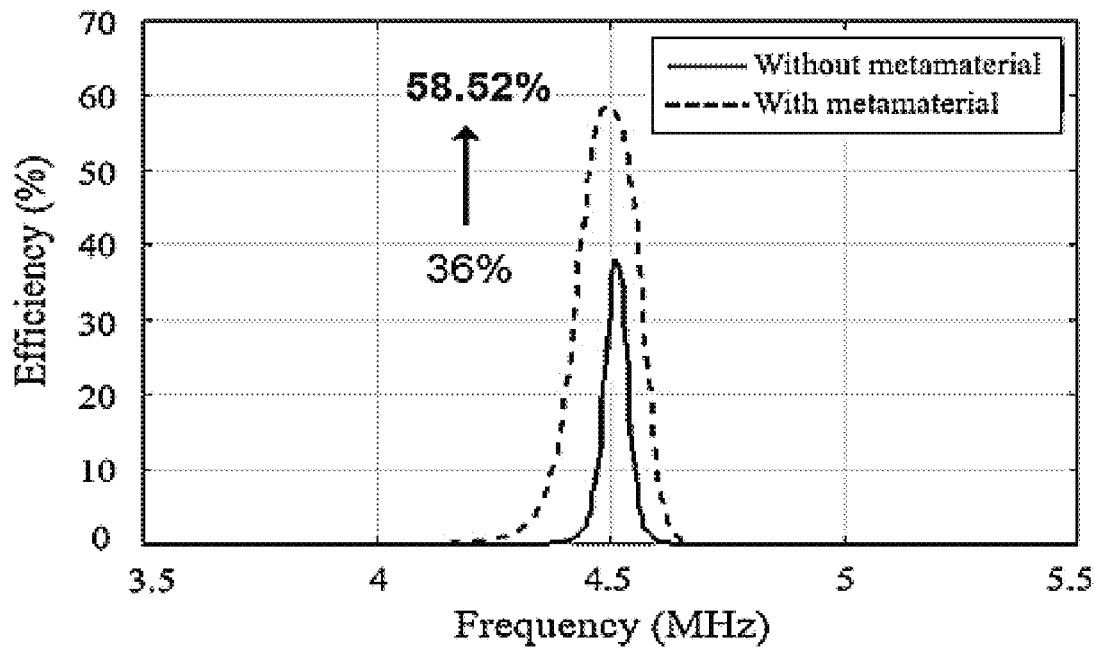
FIGS. 9D-9E are graphs showing a comparison between the measured PTE of an exemplary WPT system without metamaterial (rolled up) and with metamaterial (rolled down) at distances (D) 100 cm and (E) 150 cm in accordance with various embodiments of the present disclosure.
Figure 9E:
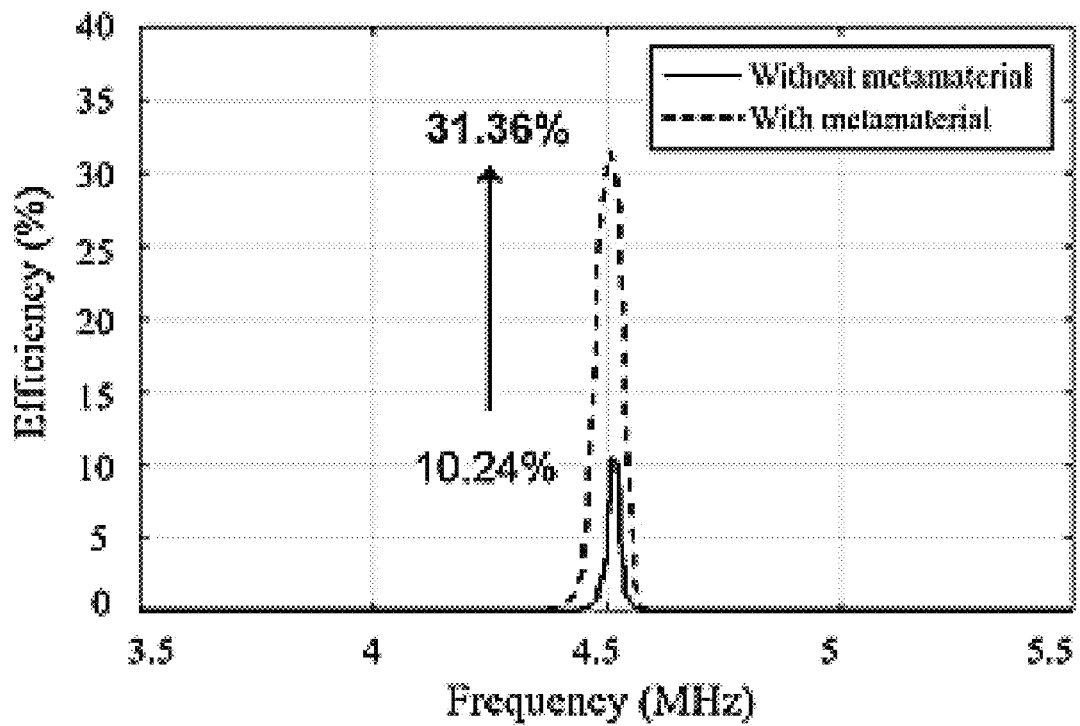

As shown in FIG. 9C, there is a threshold distance (50 cm), beyond which the WPT system with the metamaterial screen shows improved PTE. The reason is that the mutual inductance between the metamaterial screen and Tx or Rx coil increases as the transfer distance between Tx or Rx coil decreases. Therefore, as the transfer distance decreases, the resonant frequency of the WPT system also decreases but the degradation of the PTE due to the decreased resonant frequency is overcome by the increase of the PTE with metamaterial screen due to the decreased transfer distance when it becomes shorter than the threshold distance. Furthermore, for both cases with and without metamaterial screen, the increase in the transfer distance results in the linear decrease of the PTE. At the transfer distance 100 cm, the PTE increases from 36% to 58.52% after the metamaterial screen is rolled down, as shown in FIG. 9D, which is an improvement factor of 1.63. At the distance of 150 cm, the PTE improves from 10.24% to 31.36% after the metamaterial screen is rolled down, as shown in FIG. 9E, which is an improvement factor of 3.06. Comparison of the PTE without the metamaterial screen at the transfer distance 100 cm with the PTE with the metamaterial screen at the transfer distance 140 cm shows that they are approximately the same, about 36%. This means that the transfer distance of the WPT system can be effectively increased by rolling down the rollable metamaterial screen. In addition, there is no change when the metamaterial screen is rotated 90° while keeping it parallel to Tx and Rx coils. The reason for this phenomenon is that even if the orientation of the screen is changed, the negative refractive index of the metamaterial screen is the same, resulting in the same PTE improvement. The measurement results show that the rollable metamaterial screen is highly effective for increasing the PTE and the transfer distance of the WPT system.

Figure 10:
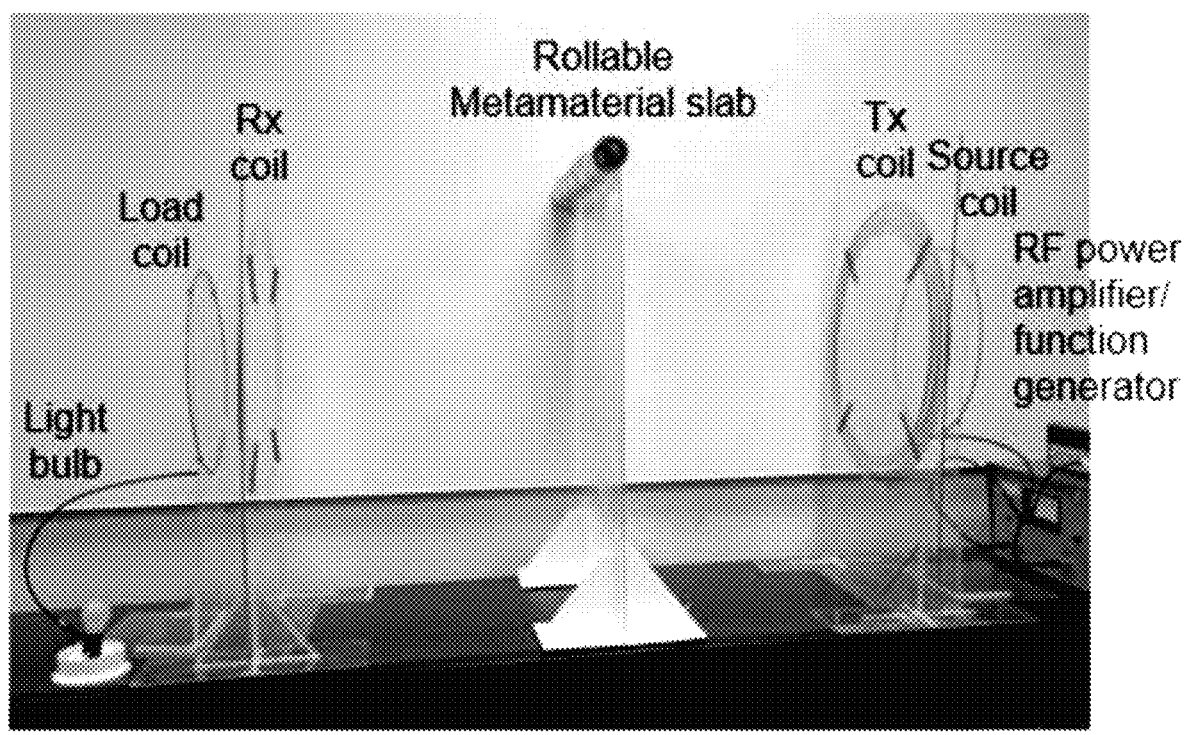
FIG. 10 shows a light bulb experimental setup for verifying the measured PTE qualitatively of an exemplary WPT system in accordance with embodiments of the present disclosure.

Next, light bulb experiments were performed to verify the measured PTE qualitatively. For these experiments, an RF power amplifier (2100L, E&I) and a function generator (33120A, HEWLETT PACKARD) were connected to the source coil, as shown in FIG. 10. AC power at 4.5 MHz was provided to the source coil using the RF power amplifier and function generator, and the provided input power was set to 80 W. At the receiver side, a 40 W light bulb was connected to the load coil. First, the intensity of the light bulb which was connected to the WPT system at a distance of 150 cm with and without the metamaterial screen was tested.

When the metamaterial screen was not added to the WPT system, the light bulb did not turn on. This means that the wirelessly transferred power was not enough to turn on the light bulb, because the PTE at a distance of 150 cm is 10.24% which is quite low. However, the light bulb turned on when the metamaterial screen 100 was unfolded in the middle of the WPT system. This shows that the transferred power was high enough or sufficient for the light bulb, where the PTE of the enhanced WPT system with the metamaterial screen 100 is 31.36% enabling 25 W of power to be transferred to the light bulb wirelessly.

Further trials were performed next to verify the increased WPT distance using the metamaterial screen 100. The intensity of the light bulb which was connected to the WPT system without the metamaterial screen at a distance of 104 cm and the intensity of the light bulb connected to the WPT system with the metamaterial screen at a distance of 155 cm were approximately the same. This means that the transfer distance of the WPT system is effectively increased by approximately 50 cm when the metamaterial screen is used. In addition, as shown in FIG. 8, the measured PTE for the (a) case without metamaterial at 104 cm and the (b) case with metamaterial at 155 cm were approximately 36% and 31.36%, respectively. Thus, the measured PTE values were approximately the same which indicates that the quantitative PTE measurement results and the qualitative light bulb experimental results are well matched with each other.

Figure 11A:
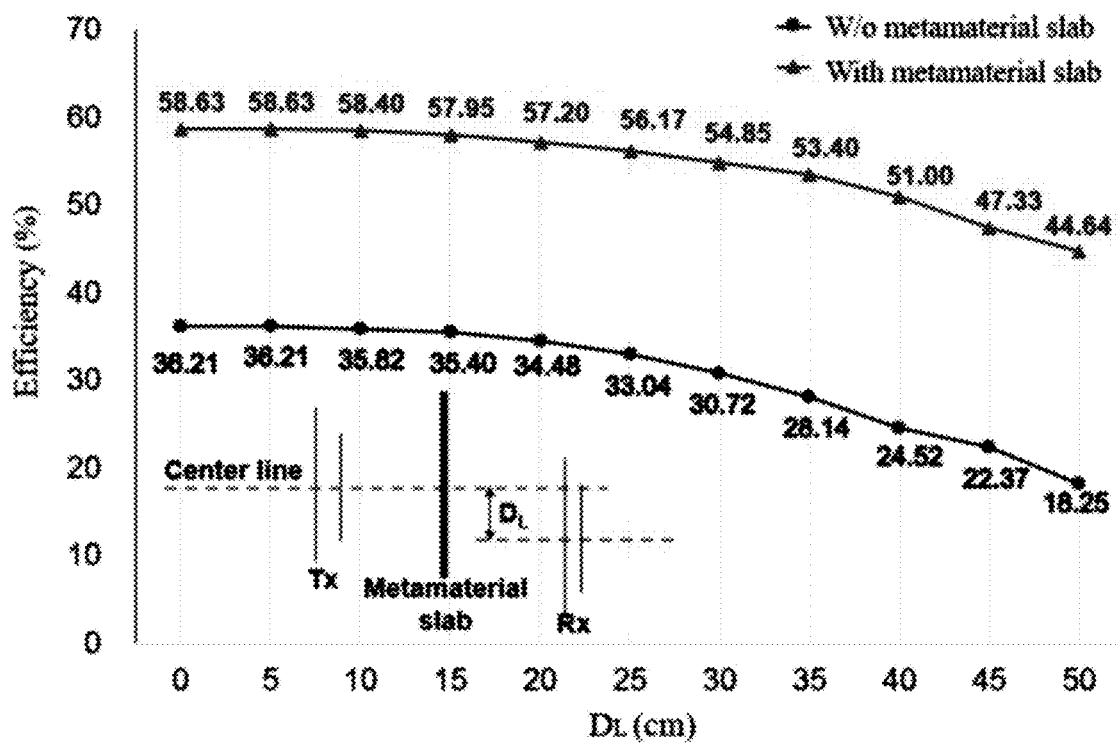
FIGS. 11A-11B are graphs showing measured PTE of an exemplary WPT system with and without a metamaterial screen at 100 cm with respect to (A) lateral misalignment (DL) and (B) angular misalignment (θ).
Figure 11B:
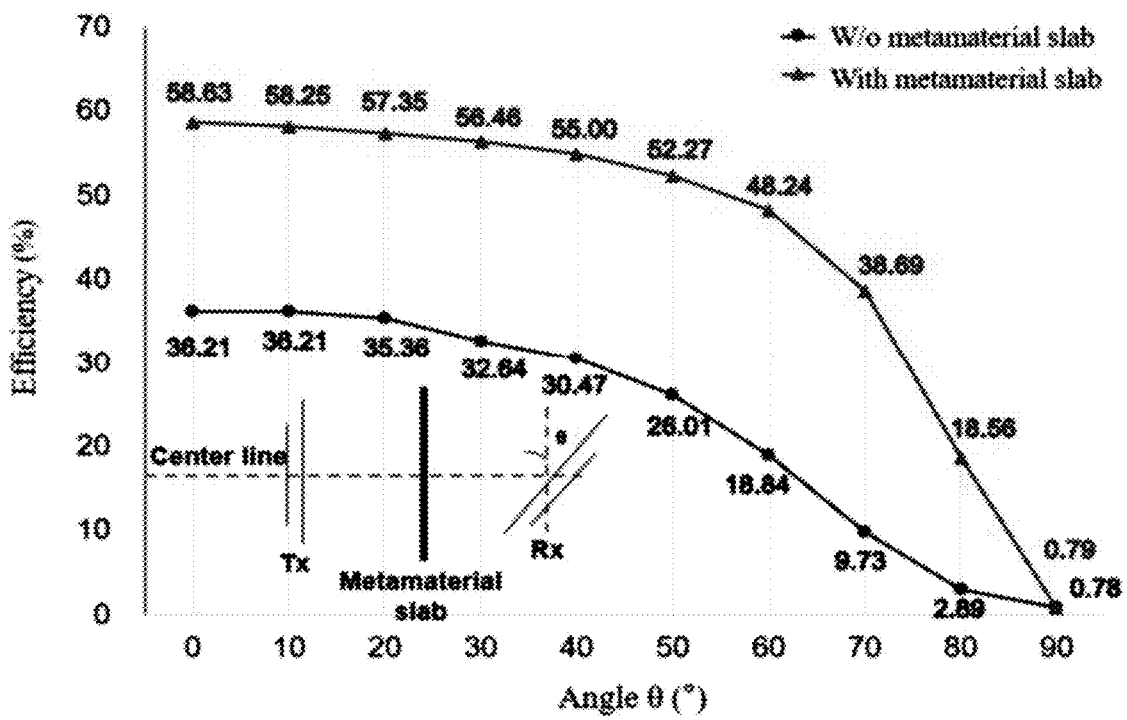

In practical applications, the exact alignment between the transmitter and receiver coils are very challenging. Obviously, the misalignments in a WPT system will degrade the performance. Therefore, trials have been performed studying the lateral and angular misalignment on the PTE of an exemplary WPT system with and without the rollable metamaterial screen 100 at a distance of 100 cm. As shown in FIG. 11A, when the misaligned lateral distance (DL) increases, the PTE decreases for both cases (with and without the metamaterial screen). However, when the metamaterial screen is rolled down, the PTE is increased by 20~25% for all distances. FIG. 1B also shows a study of the angular misalignment (θ). Here, the PTE of the WPT with and without the rollable metamaterial screen decreases when the angle of the Rx coil increases. It is noticed that the effects of the rollable metamaterial screen on the PTE decreases as the angular misalignment increases. Especially, the improved PTE is almost 0% at the angle of 90°, which means that the magnetic fields generated by the Tx coil could not cross link with the Rx coil when the Rx coil is perpendicular to the direction of the magnetic fields even though the magnetic fields are amplified by the metamaterial screen. However, in all other cases, it is proven that the rollable metamaterial screen compensates for the effects of the misalignments on the WPT system.

An exemplary enhanced WPT system with a rollable metamaterial screen (referred as "This work") is compared with the performances of previously reported metamaterial-based WPT systems in Table I (FIG. 12). For comparison purposes, the transfer distance between Tx and Rx is normalized to the radius of the Tx coil because of the different coil sizes. The equation for the normalized transfer distance is as follows:

$$\text{Normalized transfer distance} = \frac{\text{Transfer distance}}{\text{Radius of the } Tx} \quad (2)$$

It is observed that the use of a thin metal layer and flexible substrate reduces the design complexity, as well as the power losses within the metamaterial screen. The comparably low loss tangent (δ≅0.0003 at 1 MHz) and very thin thickness (0.0762 mm) of the polyethylene substrate lead to the low dielectric loss of the substrate. In addition, a simple square spiral resonator structure has advantages in terms of Q-factor over a split ring resonator structure, which results in a higher PTE. These factors allow the WPT system with the rollable metamaterial screen to have a substantially improved PTE. Moreover, the metamaterial screen has flexibility and rollability because of its extremely thin metamaterial structure which enables the consumers to utilize the space occupied by the metamaterial screen when it is rolled up.

Accordingly, the present disclosure demonstrates a rollable screen of metamaterial 100 for high efficiency magnetic resonance coupling wireless power transfer. In various embodiments, the rollable metamaterial screen 100 has a very thin structure with very low loss and rollability, realizing compactness and portability. The PTE of an exemplary enhanced WPT system can be effectively improved (over conventional systems) owing to the metamaterial's property of wave focusing and low loss. Moreover, in various embodiments, the PTE of the enhanced WPT system uses the space effectively, e.g., the screen can be rolled down only if it is needed. As for the measurement results shown, the PTE of the enhanced WPT system with rollable metamaterial screen is increased from 36% to 58.52% at 100 cm and 10.24% to 31.36% at 150 cm, for various embodiments. Experimental trials show that the quantitative measured PTE results for an exemplary enhanced WPT system are well matched to the qualitative light bulb experimental results. In addition, the lateral and angular misalignments in the enhanced WPT system have been studied for practical applications, in which the results show that an exemplary metamaterial screen 100 improves the PTE in the misaligned condition so that the rollable metamaterial screen can compensate for the effects of the misalignments. Accordingly, an enhanced WPT system with a rollable metamaterial screen brings new possibilities for practical consumer electronics, such as new techniques for wirelessly charging electronic devices with increased portability and space usage and improvements in metamaterial screen materials.

For example, in accordance with various embodiments of the present disclosure, the metamaterial screen comprises a tunable metamaterial slab, in which the tunable metamaterial slab can operate in misaligned conditions of an enhanced WPT system at 6.78 MHz, an AirFuel Alliance Standard frequency. In one embodiment, the tunable metamaterial slab has a dimension of 750 mm×750 mm and is located between transmitter (Tx) and receiver (Rx) coils of a WPT system to help focus the magnetic field where the Rx coil is located.

Figure 13:
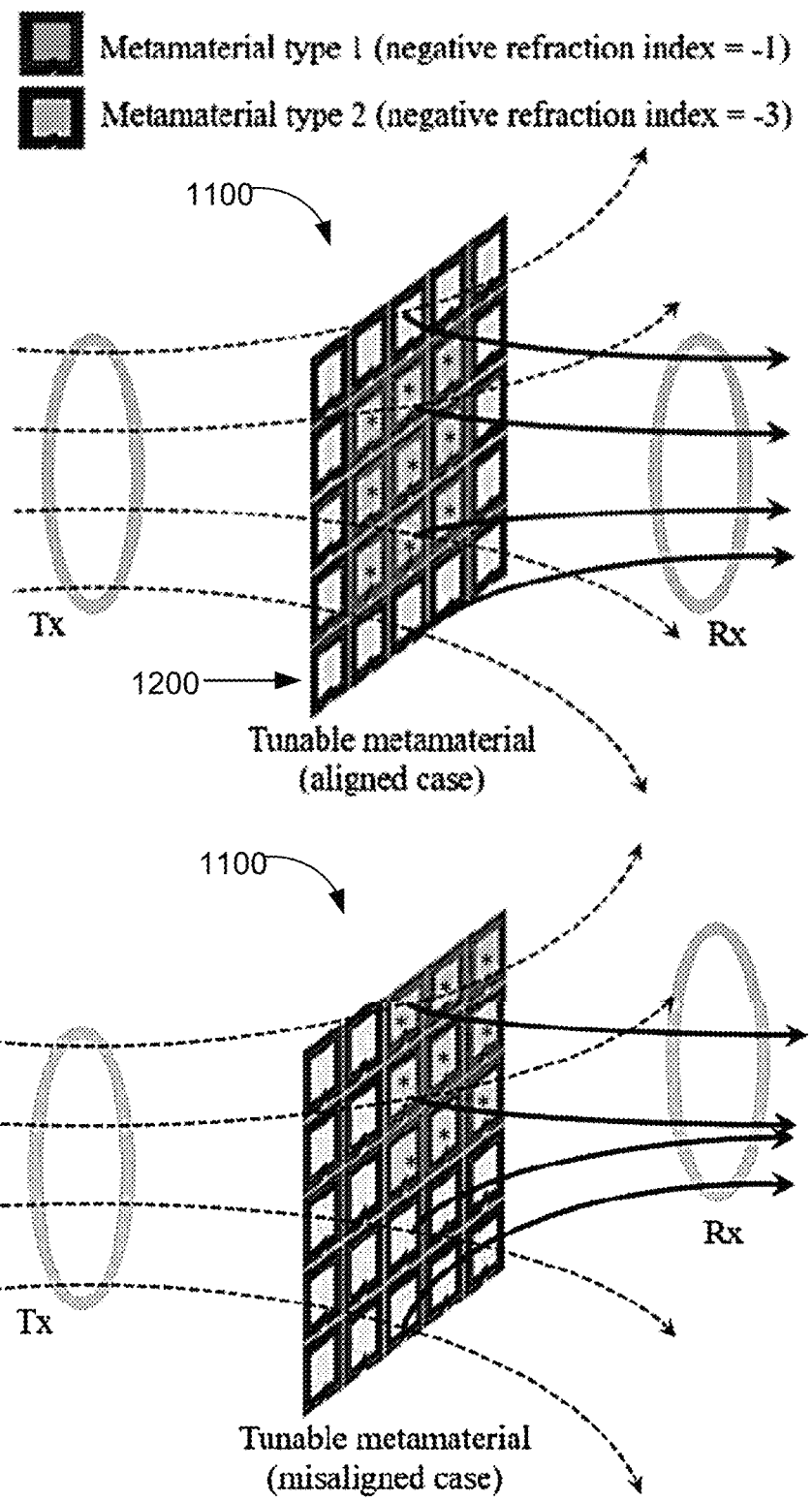
FIG. 13 shows a configuration of an exemplary tunable metamaterial slab that is located between transmitter and receiver coils in a wireless power transfer system in accordance with embodiments of the present disclosure.

In accordance with embodiments of the present disclosure, each metamaterial unit cell 1200 of the metamaterial slab 1100 can be tuned to change the direction of the magnetic field depending on the location of the Rx coil. Accordingly, the tunable metamaterial slab 1100 contains two types of unit cells which can be mutually tuned to have proper negative refractive indices, as shown in FIG. 13. As a result, the tunable metamaterial slab 1100 improves the power transfer efficiency (PTE) and compensates for the effects of the misalignments, which is a very common problem in practical WPT environments. Experimental results show that the PTE of an exemplary enhanced WPT system with the tunable metamaterial slab 1100 is increased from 5.29% to 36.2% (a factor of 6.84) in an aligned condition and 10.24% to 31.36% (a factor of 10.85) in a misaligned condition for the distance of the transmitter and receiver coils of 70 cm.

In previous works, a hybrid metamaterial slab has been reported, where two different types of metamaterial unit cells with negative and zero refraction index have been used. By locating zero permeability unit cells in the center of the slab and negative permeability unit cells in the edge of the slab, the metamaterial slab effectively focuses the magnetic field so that the improved PTE could be achieved. However, only the symmetric WPT system has been considered while misaligned conditions have not been studied.

In various embodiments of the present disclosure, a tunable metamaterial slab is incorporated in the enhanced WPT system and provides efficiency improvement in a misaligned wireless power transfer. As shown in FIG. 13, an exemplary tunable metamaterial slab 1100 can effectively change the direction of the magnetic fields depending on the location of the receiver part (Rx) as the negative refraction index of each unit cell 1200 can be tuned. In one embodiment, the exemplary metamaterial slab 1100 contains two types of unit cells which can be tunable according to the location of the Rx coil so that it compensates the low PTE associated with the misalignments. Therefore, the metamaterial slab can act as a beam focusing tunable slab enabling a WPT system to achieve a maximized PTE even in misaligned conditions.

In FIG. 13, for various embodiments, the two types of unit cells comprise a first metamaterial type (type 1) having a negative refraction index of −1 and a second metamaterial type (type 2) having a negative refraction index of −3. In the figure, the first type of unit cell (type 1) is denoted with an asterisk (*) and the second type does not have an asterisk. For practical application and testing, an asymmetric 4-coil WPT system is utilized in order to verify the feasibility of the tunable metamaterial slab 1100, in which the WPT system contains a source coil, a transmitter coil (Tx), a receiver coil (Rx), and a load coil, in which the WPT system has a comparably small receiver part which reflects modern compact mobile electronics. In an asymmetric configuration, the effectiveness of the tunable metamaterial slab 1100 in a misaligned WPT system can be studied.

Figure 14:
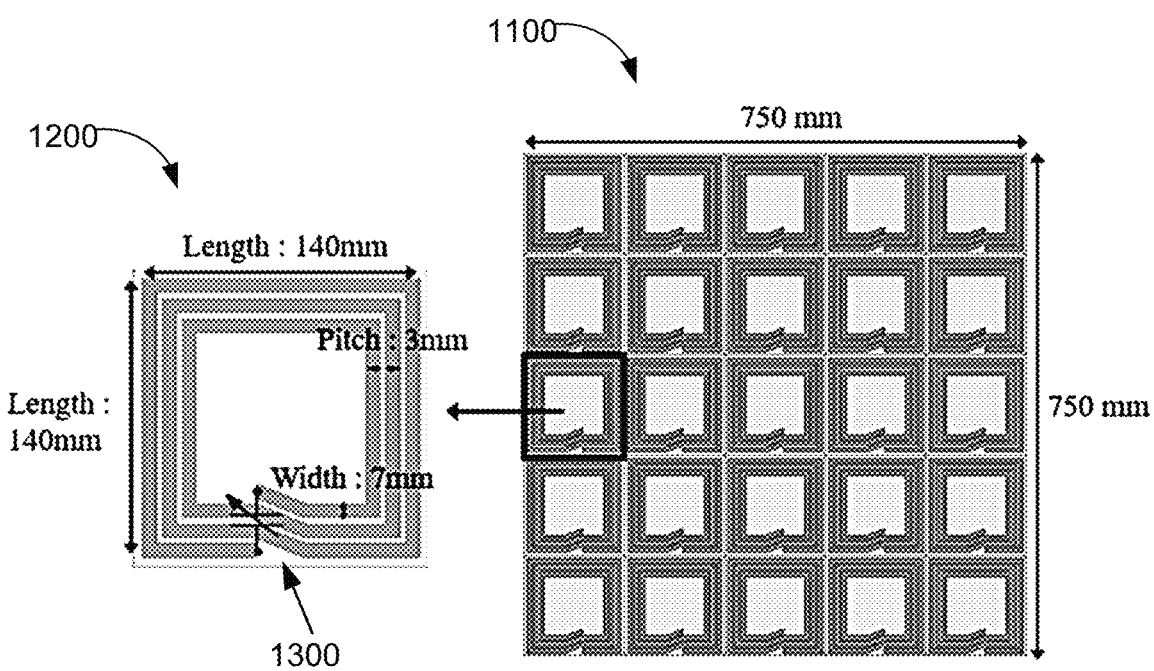
FIG. 14 shows a schematic configuration of a single metamaterial unit cell (left) and a tunable metamaterial slab (right) in accordance with embodiments of the present disclosure.

In one embodiment, the tunable metamaterial slab 1100 is composed of 5×5 metamaterial unit cells 1200 with a total dimension of 750 mm×750 mm, as shown in FIG. 14. As discussed, the tunable metamaterial slab 1100 has two types of unit cells 1200 in order to focus the magnetic field to the misaligned receiver. By connecting variable capacitors 1300 to the unit cells 1100, tunability with two different negative refraction indices is realized, which are approximately −1 and −3. Therefore, the type of unit cells can be configured according to the location of the receiver Rx. The 9-unit cells 1200 which are located relatively closer to the Rx coil are tuned to type 1 unit cells which have a negative refraction index of −1. The rest of 16-unit cells 1200 are tuned to type 2 unit cells which have a negative refraction index of −3.

In various embodiments, a square spiral shaped resonator is used for the metamaterial unit cell 1200 in order to realize a negative refraction property. The spiral resonator shaped unit cell has been reported to show a higher Q-factor than a split ring resonator one. As shown in FIG. 14, the square spiral shaped metamaterial unit cell is fabricated on a flexible polyethylene substrate ($\varepsilon_r$=2.25) with a thickness of 0.0762 mm. In various embodiments, the metamaterial unit cell 1200 has three turns, with a copper strip width of 7 mm, a gap between the lines of 3 mm, and a pitch of 10 mm. The length of the single unit cell is 140 mm and the metal (copper) thickness is 0.0799 mm, in one embodiment. In order to have tunability at the operating frequency of the WPT system, the variable capacitor 1300 is connected to each unit cell. As such, the negative refraction index of the metamaterial unit cell can be easily tuned by changing the value of the variable capacitor 1300.

A High Frequency Structure Simulator (HFSS, Ansys Inc.) has been utilized to simulate the full 3D structure of the tunable metamaterial unit cell 1200. The negative refractive index and the value of the permeability can be calculated from the simulation results by utilizing standard retrieval methods, as follows.

$$z = \pm\sqrt{\frac{(1+S_{11})^2 - S_{21}^2}{(1-S_{11})^2 - S_{21}^2}} \tag{3}$$

$$n = \frac{1}{k_0 d}\{[[\ln(e^{ink_0 d})]'' + 2m\pi] - i[\ln(e^{ink_0 d})]'\} \tag{4}$$

$$\mu_r = nz \tag{5}$$

where $S_{11}$ and $S_{21}$ are the reflection and transmission coefficients; (•)' and (•)" denote the real part and imaginary part of the complex numbers, respectively; n is the refractive index; $k_0$ is the wavenumber; d is the maximum thickness of the slab; z is the impedance; m is the integer related to the branch index of n'; and $\mu_r$ is the relative permeability.

Figure 15A:
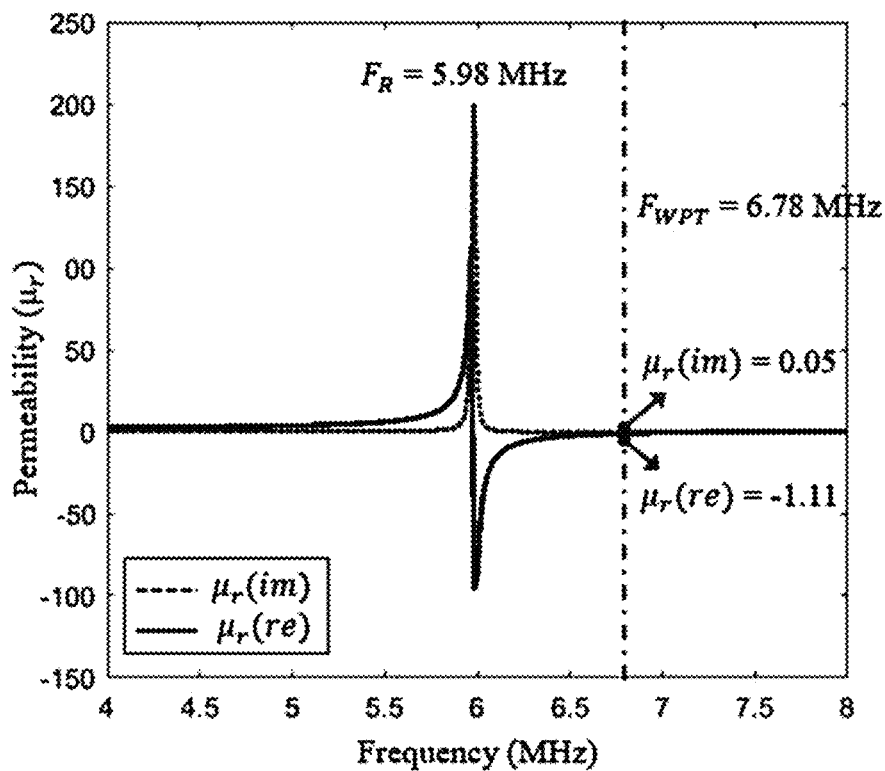
FIGS. 15A-15B show simulation results of relative permeability for the metamaterial unit cell with a negative refraction index of (A) −1.11 (for type 1) and (B) 3.07 (for type 2).
Figure 15B:
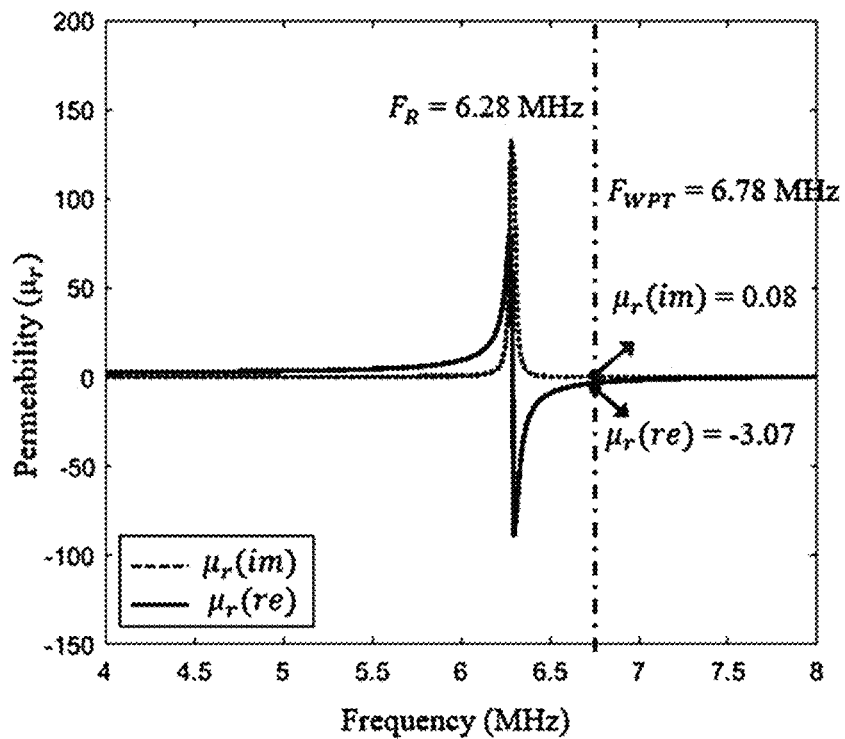

In the simulation result (FIGS. 15A-15B), the real part of the permeability represents the refraction index which indicates the direction of magnetic field by the boundary conditions, and the imaginary part reflects the magnetic loss. Accordingly, those two parts are designed carefully in order to achieve an improved transfer efficiency. In various embodiments of the present disclosure, the resonant frequency of an exemplary embodiment of the enhanced WPT system with the tunable metamaterial slab is designed to be 6.78 MHz, an AirFuel Alliance Standard frequency.

Figure 16:
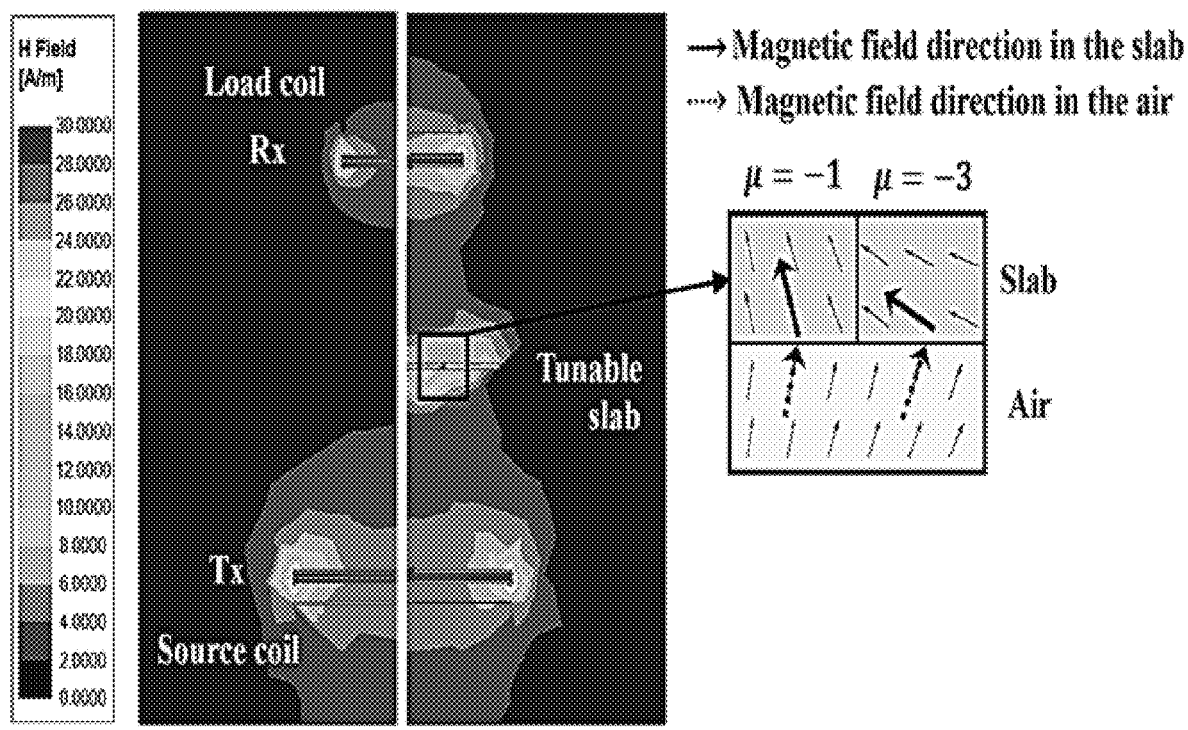
FIG. 16 shows the magnetic field distribution of an exemplary WPT without tunable metamaterial slab (left) and with tunable metamaterial slab (right) in accordance with various embodiments of the present disclosure.

In various embodiments, the type 1 unit cells have a capacitance of 430 pF, and a resonance frequency of 5.98 MHz. The negative refraction index of the type 1 unit cells is −1.11, and the imaginary value of the relative permeability is 0.05 at 6.78 MHz. Correspondingly, the type 2 unit cells have a capacitance of 390 pF and a resonance frequency of 6.28 MHz. This resonant frequency of the type 2 unit cell is increased compared with the resonant frequency of the type 1 unit cell owing to the decrease in capacitance value of the variable capacitor 1300. At 6.78 MHz, the negative refraction index of the type 2 unit cell is −3.07, and the imaginary value of the relative permeability is 0.08. Therefore, the designed metamaterial slab has a tunable characteristic in terms of the negative refraction index. Moreover, to verify the field focusing property of the tunable MTM slab, the magnetic field distributions of the WPT with tunable slab is simulated, as shown in FIG. 16. The figure shows that the magnetic fields between Tx and Rx are enhanced when the tunable MTM slab is inserted and the permeability of −3 has better field focusing at the boundary of slab than that of −1.

Figure 17:
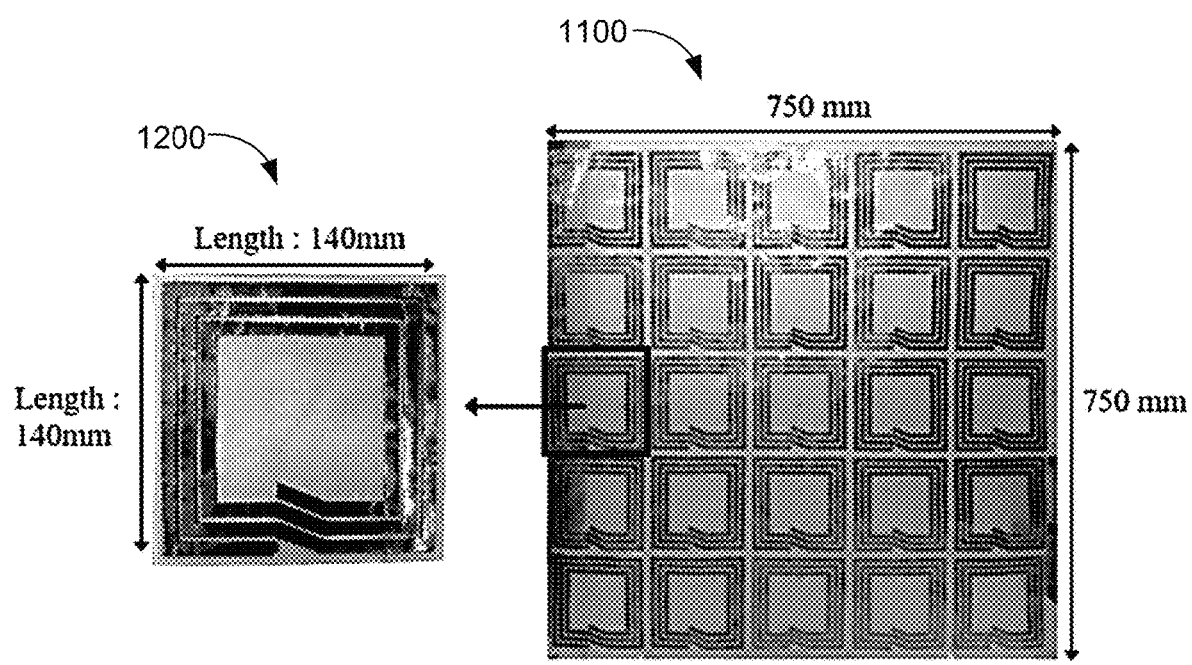
FIG. 17 is an image of a fabricated single metamaterial unit cell (left) and metamaterial slab (right) in accordance with embodiments of the present disclosure.

As shown in FIG. 17, the tunable metamaterial slab is fabricated on a polyethylene substrate, in one embodiment. In order to have tunability, a variable capacitor 1300 (JZ 500, Knowles Voltronics) is connected to each unit cell 1200 in parallel. This tunable metamaterial slab 1100 can effectively change the direction of the magnetic fields depending on the location of the receiver part (Rx) as the negative refraction index of each unit cell can be tuned. Thus, this beam focusing tunable slab 1100 is configured to make a WPT system achieve a maximized PTE even in misaligned conditions.

In one embodiment, the source coil of the WPT system has a single turn with a diameter of 400 mm. The Tx coil has 6 turns, a turn-to-turn pitch of 10 mm, and an outer diameter of 600 mm. As for a receiver part (Rx), the load coil has a single turn with a diameter of 150 mm and Rx coil has 6 turns, a pitch of 10 mm, and an outer diameter of 150 mm. All the coils are fabricated using a 2.588 mm diameter copper wire, and the WPT system resonates at 6.78 MHz.

Figure 18:
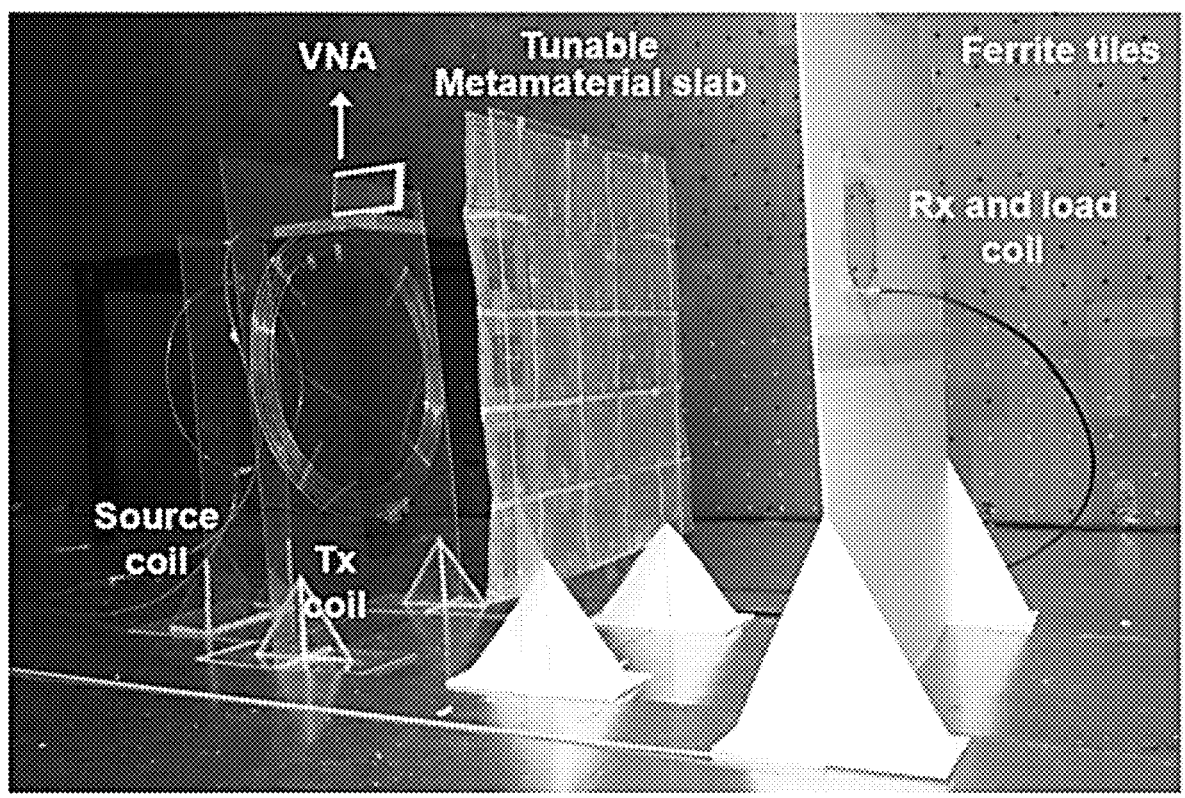
FIG. 18 is an image of a measurement setup in an anechoic chamber for an exemplary enhanced WPT system with a tunable metamaterial slab in accordance with embodiments of the present disclosure.
Figure 19A:
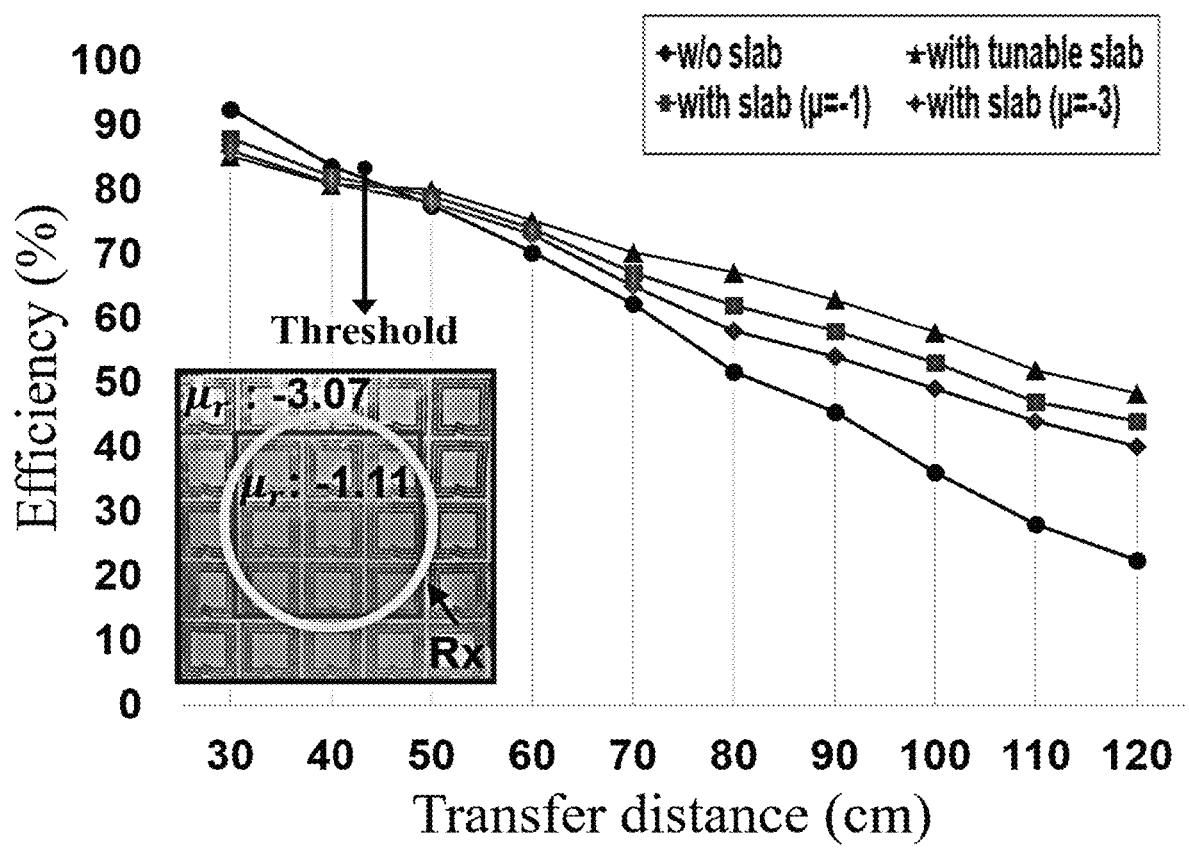
FIGS. 19A-19D are graphs of PTE measurements of an exemplary WPT system without and with a metamaterial slab for (A) a first aligned case (case 1/Rx diameter: 600 mm), (B) a second aligned case (case 2/Rx diameter: 150 mm), (C) a third misaligned case with the Rx coil located in the upper side from the center (case 3/Rx diameter: 150 mm), and (D) a fourth misaligned case with the Rx coil located in the upper right side from the center (case 4/Rx diameter: 150 mm) in accordance with embodiments of the present disclosure.
Figure 19B:
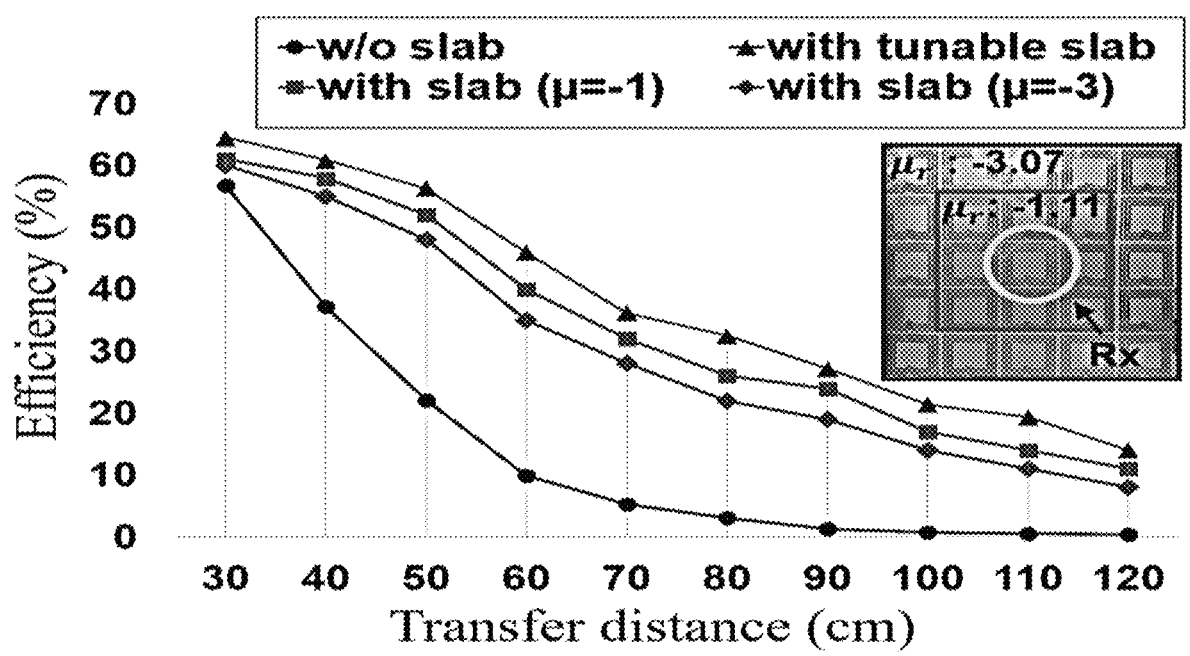
Figure 19C:
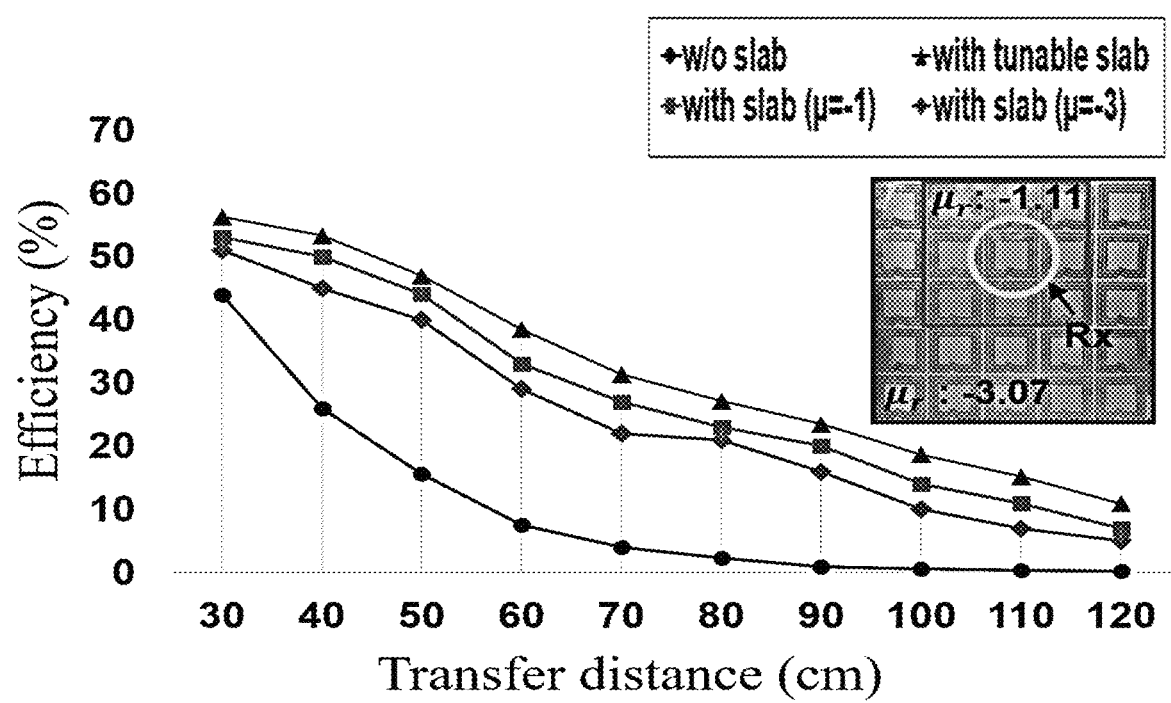
Figure 19D:
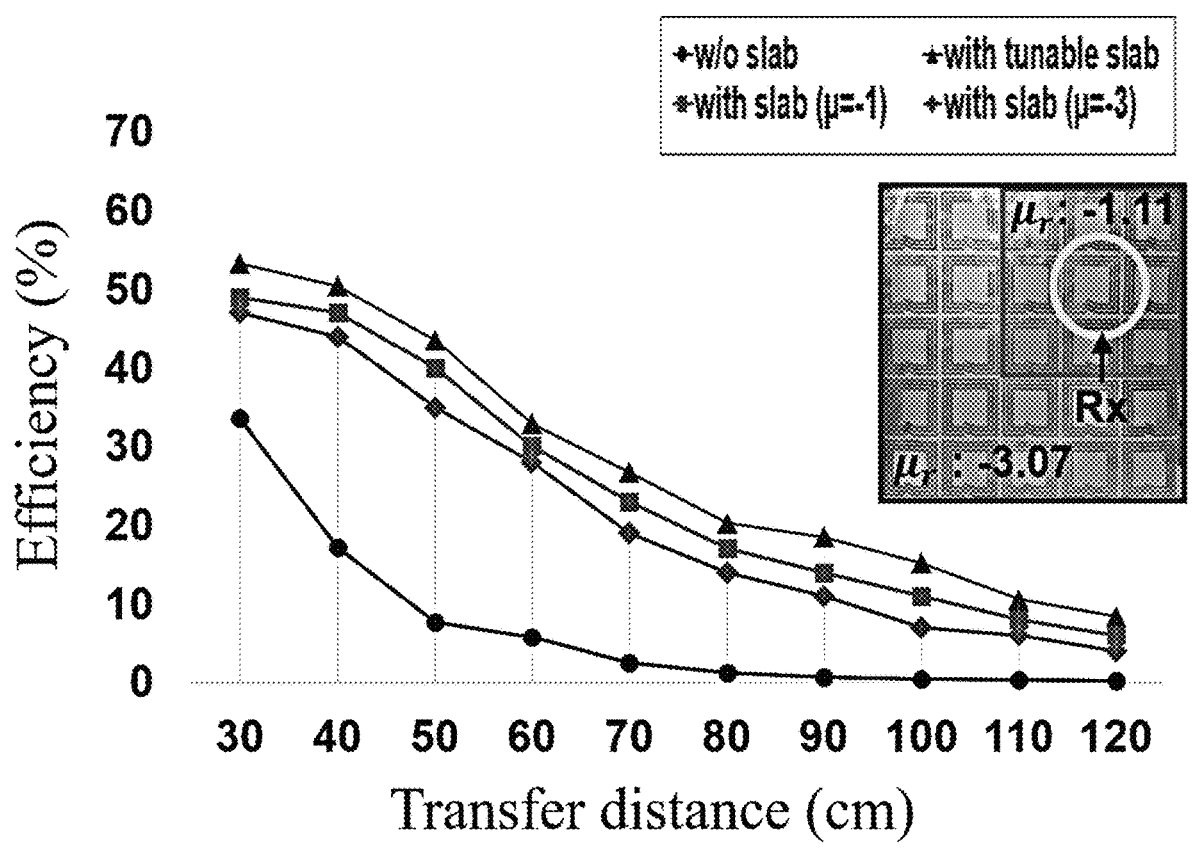

As shown in FIG. 18, the PTE of an exemplary enhanced WPT system with the tunable metamaterial slab 100 is measured in an anechoic chamber which enables the precise PTE measurement without the contribution of the reflected electromagnetic waves and external interferences. For the measurement, a vector network analyzer (HP E8361A, Agilent, Inc.) is utilized. The PTE can be calculated using Equation (1).

The PTE of the WPT with and without the metamaterial slab is measured for four different cases in terms of alignment conditions and coil sizes. As for case 1 and 2, the Rx coils (diameter of 600 mm for case 1 and 150 mm for case 2) are located in the center of the slab which is in an aligned condition. The unit cells in the center are tuned to type 1 ($\mu_r$=−1.11) and the unit cells in the outer part are tuned to type 2 ($\mu_r$=−3.07). In case 3 and 4, the locations of the Rx coil are in the upper side and upper right side, respectively, which are in misaligned conditions. For these cases, the 9 unit cells near the Rx coil become type 1 and the rests of 16 unit cells become type 2.

As shown in FIGS. 19A-19D, the WPT systems with the tunable MTM slab show improved PTE for all distances except for case 1. Without the MTM slab, the increase of the transfer distance results in significant decrease in the PTE. However, the decreasing slope of the PTE becomes approximately linear when the MTM slab is inserted which means the MTM slab helps focus magnetic field lines effectively, thereby increasing the PTE and transfer distance. For the verification of the use of two unit cells, the PTE of the WPT system is measured with MTM slabs composed of type 1 ($\mu$=−1) unit cells only and the type 2 ($\mu$=−3) unit cells only, respectively. The PTE of the WPT system with the tunable slab shows the highest PTE and followed by the PTE of the WPT with slab ($\mu$=−1) and that with slab ($\mu$=−3) for all cases which proves the concept of the tunable slab. The slab with $\mu$=−3 shows the worst PTE since the slab with $\mu$=−3 has a higher magnetic loss than the slab with $\mu$=−1.

In addition, the PTE of the WPT system with the tunable slab at a distance of 70 cm is increased from 5.29% to 36.2% (a factor of 6.84) for case 2, from 4% to 31.36% (a factor of 7.84) for case 3, and from 2.46% to 26.7% (a factor of 10.85) for case 4. The results show that as the degree of misalignment gets more significant, the PTE of the WPT system more severely decreases in both cases with and without the slab. However, the contrast of the PTE between with and without the slab is increasing, which means that the reduced PTE associated with the misalignments on the WPT system is effectively compensated or sustained by placing the tunable slab.

The demonstrated WPT system with the tunable MTM slab is compared with other reported MTM based WPT systems, as shown in Table II (FIG. 20). For performance comparison, the transfer distance between Tx and Rx coils and the working distance between the MTM slab and Rx are normalized to the geometrical mean of Tx and Rx radius as shown in Equation (4).

$$D_{norm} = \frac{D}{\sqrt{r_T \cdot r_R}} \qquad (5)$$

where D, $D_{norm}$, $r_T$, and $r_R$ are the distance, normalized distance, Tx radius, and Rx radius, respectively.

The WPT systems with the tunable slab have shown overall improved PTE compared to other work(s) in an aligned condition while this is the only work addressing tunable MTM based PTE improvement for misaligned conditions among selected work(s). The high PTE can be achieved by tuning the MTM slab according to the location of the Rx, changing outward magnetic field direction toward the Rx. In addition, the tunable MTM slab reported here has a significantly smaller thickness of 0.16 mm compared with others, realizing system compactness, weight reduction, and increased portability. The reduced thickness is realized by using a thinner dielectric layer, and this very thin thickness and comparably low loss tangent ($\delta \cong 0.0003$ at 1 MHz) of the polyethylene substrate contribute to reducing the dielectric loss and improving overall PTE. In addition, the use of a spiral shape unit cell structure has advantages in terms of Q-factor, resulting in high PTE.

In review, the present disclosure demonstrates the efficiency improvement in a misaligned WPT with the integration of a tunable metamaterial slab 1100. In accordance with embodiments of the present disclosure, an exemplary metamaterial slab 1100 contains two types of unit cells which are tunable depending on the location of the Rx coil, such that the metamaterial slab compensates for the effects of misalignments in the WPT system. Via the metamaterial slab 1100, magnetic fields can be strongly confined to the Rx coil, thereby improving the PTE and transfer distance of the WPT system. Experimental results show that an exemplary metamaterial slab 1100 improves the PTE in the misaligned condition. Thus, an exemplary tunable metamaterial slab in accordance with embodiments of the present disclosure provides new possibilities for practical WPT systems with increased efficiency in various situations and applications.

As discussed, modern wireless power transfer (WPT) systems need to be compliant with the technology trend of reduced size, weight, and power (SWaP). Especially for the efficient usage of the space, the modern electronics transform their form factors to be deformed, rolled, and folded, e.g. rollable TVs and foldable phones without compromising the performance of the electronic systems. If this trend can be addressed in the WPT systems using metamaterial screen while being compliant with the commercial WPT standards, it can take one step closer to the practical applications toward the efficient usage of the space. For example, a rollable TV can be equipped with a rollable metamaterial screen based WPT, as shown in FIGS. 21A-21B. If a Tx coil is embedded in the wall and a rollable TV equipped with a metamaterial screen based WPT system is placed in front of the wall, the wireless power can be transmitted from Tx to Rx when the rollable TV is rolled up from the floor, such that the embedded metamaterial screen amplifies and focuses the magnetic field, thereby providing improved wireless power transmission. In on embodiment, most of the electrodes in the rollable TV can be made of transparent ITO/zinc oxide/graphene so that the metamaterial screen does not interfere with TV or video streaming function. This embedded metamaterial screen concept also can be applied to any rollable electronic device (e.g. rollable phone/tablet), as shown in FIGS. 22A-22B, where a metamaterial screen can be stretched out to receive WPT communications. As a result and in accordance with embodiments of the present disclosure, an exemplary embedded rollable metamaterial screen has a high potential to be applied to commercial electronic devices that need a WPT system.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A wireless power transfer system comprising:
   a transmitter coil coupled to a power source;
   a receiver coil coupled to a load; and
   a metamaterial screen disposed between the transmitter coil and the receiver coil and configured to amplify and focus a magnetic field generated by the transmitter coil towards the receiver coil in a non-contact manner; wherein the metamaterial screen comprises a tunable metamaterial slab, wherein the tunable metamaterial slab comprises an array of metamaterial unit cells, wherein a negative refraction index of the metamaterial unit cell is tunable between a first negative refraction index and a second negative refraction index via a variable capacitor connected to each of the metamaterial unit cells in parallel.

2. The system of claim 1, wherein the metamaterial screen comprises a rollable metamaterial screen.

3. The system of claim 1, wherein each metamaterial unit cell comprises a spiral shaped metamaterial unit cell.

4. The system of claim 1, wherein a resonance operating frequency of wireless power transfer system is 4.5 MHz, wherein the metamaterial screen has a 940 pF capacitor connected to each of the metamaterial unit cells in parallel.

5. The system of claim 1, wherein the metamaterial screen is formed on a flexible substrate.

6. The system of claim 1, wherein the transmitter coil and the receiver coil are separated by a distance of at least 50 cm.

7. The system of claim 1, wherein the receiver coil is configured to receive the generated magnetic field from the transmitter coil at an angle of misalignment less than 90 degrees.

8. The system of claim 1, wherein the negative refraction index of each metamaterial unit cell is configured to be tuned based on a location of the receiver coil.

9. The system of claim 8, wherein the metamaterial screen is formed of a 5×5 array of metamaterial unit cells, wherein 9 of the metamaterial unit cells which are located closest to the receiver coil are tuned to the first negative refraction index and the remaining 16 metamaterial unit cells are tuned to the second negative refraction index.

10. The system of claim 9, wherein the first negative refraction index is −1 and the second negative refraction index is −3.

11. The system of claim 9, wherein a subset of the metamaterial unit cells are tuned to the first negative refraction index that are aligned with the receiver coil and a remainder of the metamaterial unit cells are tuned to the second negative refraction index that are not aligned with the receiver coil.

12. A method for wireless power transfer communications comprising:
    disposing, a rollable metamaterial screen between a wireless power transfer transmitter coil and a wireless power transfer receiver;
    extending the rollable metamaterial screen to a stretched out position; and
    after extending the rollable metamaterial screen, amplifying and focusing, via the rollable metamaterial screen, a magnetic field generated by the transmitter coil towards the receiver coil in a non-contact manner.

13. The method of claim 12, wherein the rollable metamaterial screen comprises an array of metamaterial unit cells, wherein each metamaterial unit cell has a negative refraction index.

14. The method of claim 13, wherein a resonance operating frequency of wireless power transfer system is 4.5 MHz or 6.78 MHz, wherein the metamaterial screen has a capacitor connected to each of the metamaterial unit cells in parallel.

15. The method of claim 12, wherein the metamaterial screen comprises a tunable metamaterial slab, wherein the tunable metamaterial slab comprises an array of metamaterial unit cells, wherein a negative refraction index of the metamaterial unit cell is tunable between a first negative refraction index and a second negative refraction index via a variable capacitor connected to each of the metamaterial unit cells in parallel.

16. The method of claim 15, further comprising tuning the negative refraction index of each metamaterial unit cell based on a location of the receiver coil.

* * * * *